(12) United States Patent
Sahin et al.

(10) Patent No.: US 10,397,803 B2
(45) Date of Patent: Aug. 27, 2019

(54) SYSTEMS AND METHODS FOR DIRECTIONAL MESH NETWORKS WITH JOINT BACKHAUL AND ACCESS LINK DESIGN

(71) Applicant: IDAC Holdings, Inc., Wilmington, DE (US)

(72) Inventors: Onur Sahin, Brooklyn, NY (US); Samian Kaur, Plymouth Meeting, PA (US); Philip J. Pietraski, Jericho, NY (US); Ravikumar V. Pragada, Collegeville, PA (US); Douglas R. Castor, Norristown, PA (US); Arnab Roy, East Norriton, PA (US)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 14/400,152

(22) PCT Filed: May 10, 2013

(86) PCT No.: PCT/US2013/040576
§ 371 (c)(1),
(2) Date: Nov. 10, 2014

(87) PCT Pub. No.: WO2013/170169
PCT Pub. Date: Nov. 14, 2013

(65) Prior Publication Data
US 2015/0109943 A1    Apr. 23, 2015

Related U.S. Application Data

(60) Provisional application No. 61/645,352, filed on May 10, 2012, provisional application No. 61/645,156, filed on May 10, 2012.

(51) Int. Cl.
*H04W 16/28* (2009.01)
*H04W 24/02* (2009.01)
(Continued)

(52) U.S. Cl.
CPC .......... *H04W 16/28* (2013.01); *H04W 24/02* (2013.01); *H04W 48/16* (2013.01); *H04W 84/18* (2013.01)

(58) Field of Classification Search
None
See application file for complete search history.

(56) References Cited

U.S. PATENT DOCUMENTS 6,951,573 B1 * 10/2005 Dilling .................. A61F 2/2403
623/2.1
6,961,573 B1 * 11/2005 Moon .................... H04W 40/02
455/445

(Continued)

OTHER PUBLICATIONS

Das et al., "DMesh: Incorporating Practical Directional Antennas in Multichannel Wireless Mesh Networks", IEEE Journal on Selected Areas in Communications, vol. 24, No. 11, Nov. 2006, pp. 2028-2039.

(Continued)

*Primary Examiner* — Jospeh A Bednash
(74) *Attorney, Agent, or Firm* — Condo Roccia Koptiw LLP

(57) ABSTRACT

A cellular communications network may be configured to leverage a millimeter wave (mmW) mesh network. Base stations may be configured to operate as mmW base stations (tnBs). Such base stations may be configured to participate in the mmW mesh network and to access the cellular communications network (e.g., via cellular access links). A network device of the cellular communications network (e.g., an eNB) may operate as a control entity with respect to one or more niBs. Such a network device may govern (Continued)

mesh backhaul routing with respect to the cellular communications network and the mmW mesh network. Such a network device may configure the mmW mesh network, for example by performing a process to join a new mB to the mmW mesh network. A WTRU may send and receive control information via a cellular access fink and may send and receive data via the mmW mesh network.

20 Claims, 18 Drawing Sheets

(51) Int. Cl.
    *H04W 48/16*     (2009.01)
    *H04W 84/18*     (2009.01)

(56) References Cited

U.S. PATENT DOCUMENTS

| | | | |
|---|---|---|---|
| 2002/0159409 A1* | 10/2002 | Wolfe | H04W 92/20 370/329 |
| 2007/0060098 A1* | 3/2007 | McCoy | G01S 5/0289 455/404.2 |
| 2007/0099634 A1* | 5/2007 | Chari | H04L 67/2804 455/456.3 |
| 2009/0323608 A1 | 12/2009 | Adachi et al. | |
| 2010/0074190 A1 | 3/2010 | Cordeiro et al. | |
| 2012/0243638 A1* | 9/2012 | Maltsev | H04W 72/0453 375/316 |

OTHER PUBLICATIONS

IEEE, "Draft STANDARD for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Amendment 10: Mesh Networking", P802.11s/D3.0, Mar. 2009.

Interdigital Communication LLC, "Radio Network Evolution (RNE) Overview", 2011, 101 pages.

Khan et al., "Millimeter-Wave Mobile Broadband: Unleasing 3-300GHz Spectrum", Samsung, Mar. 28, 2011, pp. 1-117.

* cited by examiner

SYSTEMS AND METHODS FOR DIRECTIONAL MESH NETWORKS WITH JOINT BACKHAUL AND ACCESS LINK DESIGN

CROSS-REFERENCE TO RELATED APPLICATIONS

This application is the National Stage Entry under 35 U.S.C. § 371 of Patent Cooperation Treaty Application No. PCT/US2013/040576, filed May 10, 2013, which claims priority to U.S. provisional patent application nos. 61/645,352, filed May 10, 2012, and 61/645,156, filed May 10, 2012, both of which are incorporated herein by reference in their entireties.

BACKGROUND

In recent years demand for cellular network bandwidth has steadily increased. Increases in cellular network bandwidth demand are predicted to continue, for instance in accordance with capabilities of LTE and/or LTE advanced networks that offer significantly higher data transmission rates. Within the radio frequency spectrum typically reserved for cellular network communications, ensuring that there is sufficient bandwidth to enable efficient and reliable communications across these wireless communications networks, for instance sufficient for transporting video, continues to be challenging. For instance, the rapid adoption of smart phones that are capable of generating and displaying video may place additional demands on these wireless communication networks.

SUMMARY

One or more base stations of a cellular communications network may be configured to operate as millimeter wave (mmW) base stations (mBs). Such mBs may be configured to participate in an mmW mesh network and to access the cellular communications network, for example via cellular access links. Example configurations of mBs may be enabled by interfaces among the nodes in accordance with different node deployment scenarios. Methods that enable initial startup procedures for such mBs are disclosed.

A network device of the cellular communications network, for example an eNB, may operate as a control entity with respect to one or more mBs. Such a network device may configure the mmW mesh network, for example by performing a process to join a new mB to the mmW mesh network. For example, such an eNB may assist with the establishment of transmit-receive beam orientation between one or more mBs, in accordance with signal levels between the mBs and/or interference levels at one or more neighboring mBs, for example using cellular layer communications.

Such an eNB network device may govern mesh backhaul routing with respect to the cellular communications network and the mmW mesh network. Cellular connectivity (e.g., cellular access links) may be used to provide routing information to mBs and/or to collect channel information (e.g., average and/or instantaneous gain information) from the mBs. The eNB may use such information to govern routing through the cellular communications network and the mmW mesh network. A WTRU configured for mmW communications may send and receive control information via a cellular access link, and may send and receive data via the mmW mesh network, for example.

DETAILED DESCRIPTION

Figure 1A:
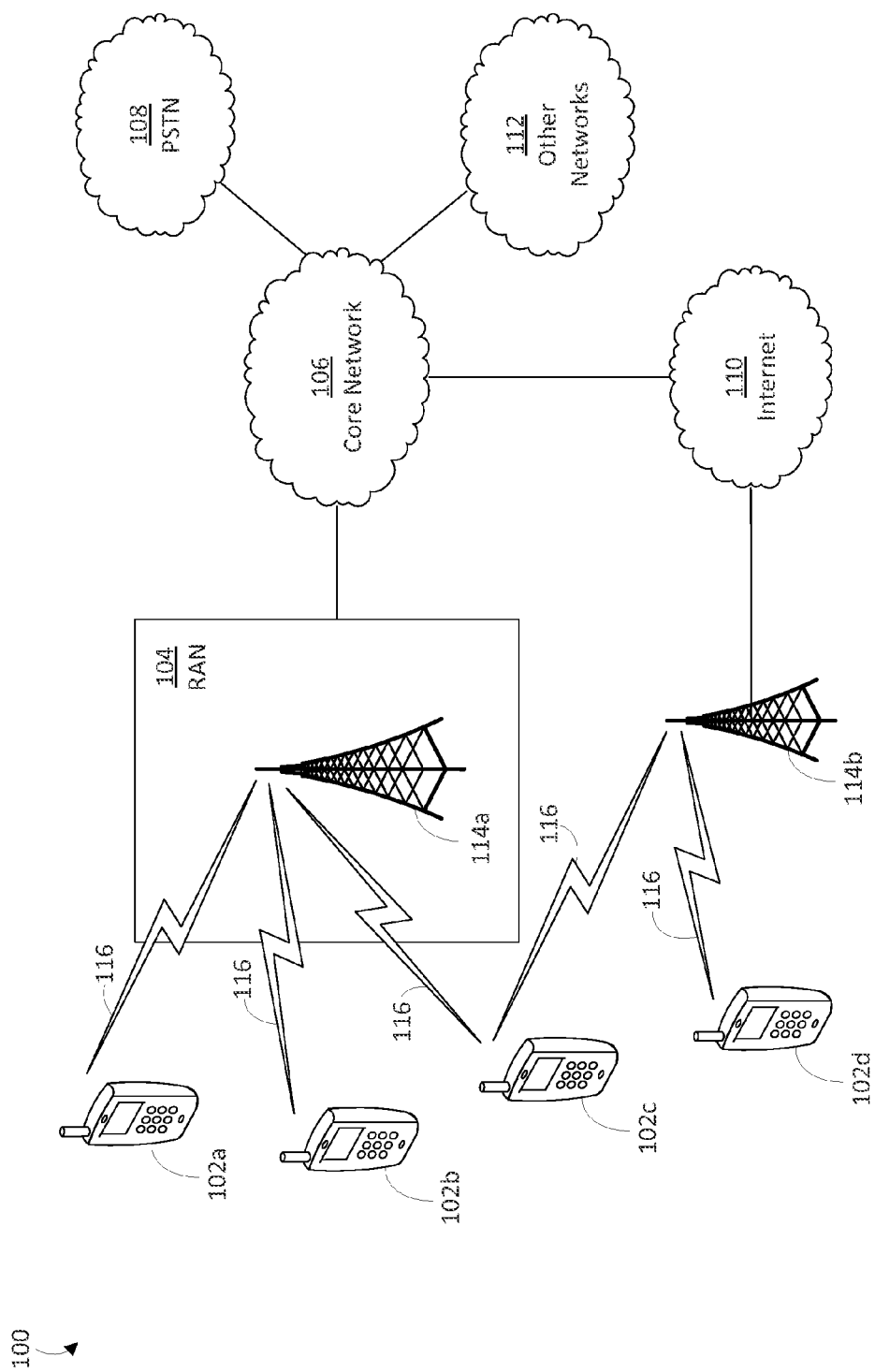
FIG. 1A depicts a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include at least one wireless transmit/receive unit (WTRU), such as a plurality of WTRUs, for instance WTRUs 102a, 102b, 102c, and 102d, a radio access network (RAN) 104, a core network 106, a public switched telephone network (PSTN) 108, the Internet 110, and other networks 112, though it should be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it should be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 14a, 14b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e. Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE). GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it should be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
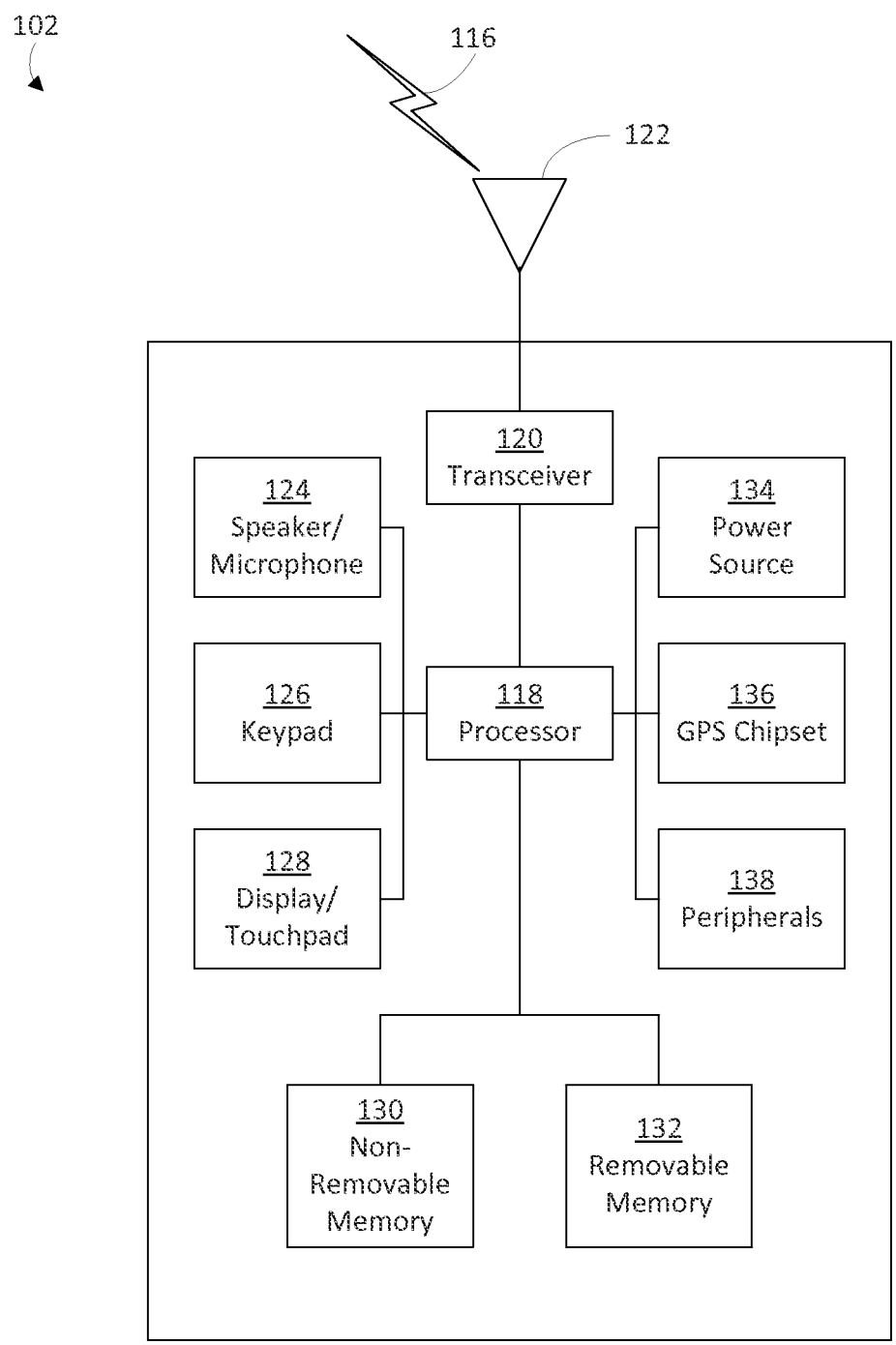
FIG. 1B depicts a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It should be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it should be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It should be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It should be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
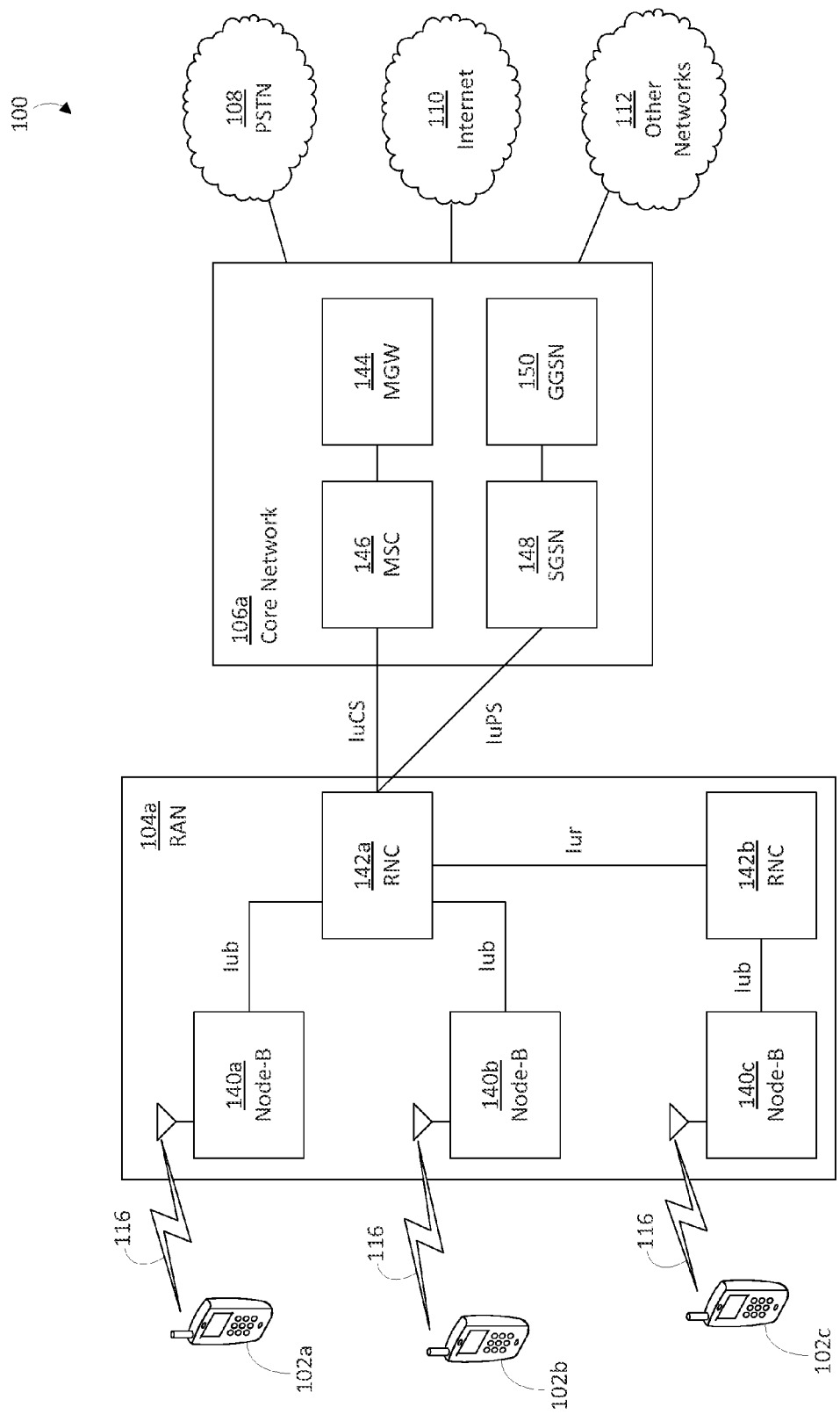
FIG. 1C depicts a system diagram of an example radio access network and an example core network that may be used within the communications system illustrated in FIG. 1A.

FIG. 1C is a system diagram of an embodiment of the communications system 100 that includes a RAN 104a and a core network 106a that comprise example implementations of the RAN 104 and the core network 106, respectively. As noted above, the RAN 104, for instance the RAN 104a, may employ a UTRA radio technology to communicate with the WTRUs 102a, 102b, 102c over the air interface 116. The RAN 104a may also be in communication with the core network 106a. As shown in FIG. 1C, the RAN 104a may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104a. The RAN 104a may also include RNCs 142a, 142b. It should be appreciated that the RAN 104a may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106a shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements is depicted as part of the core network 106a, it should be appreciated that any one of these elements may be owned and/or operated by an entity other than the core network operator.

The RNC 142a in the RAN 104a may be connected to the MSC 146 in the core network 106a via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104a may also be connected to the SGSN 148 in the core network 106a via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between the WTRUs 102a, 102b, 102c and IP-enabled devices.

As noted above, the core network 106a may also be connected to the networks 112, which may include other wired or wireless networks that are owned and/or operated by other service providers.

Figure 1D:
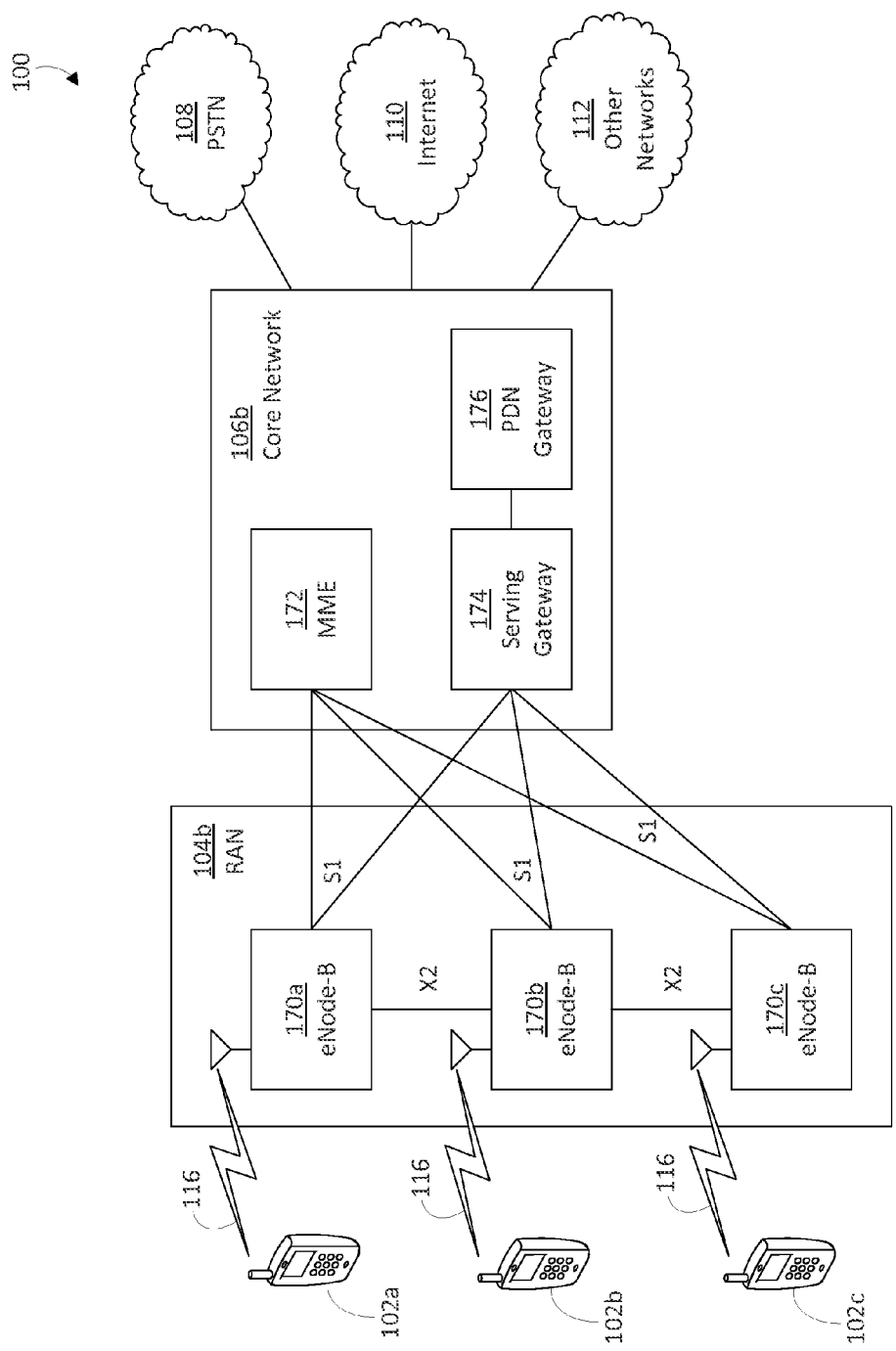
FIG. 1D depicts a system diagram of an example radio access network and an example core network that may be used within the communications system illustrated in FIG. 1A.

FIG. 1D is a system diagram of an embodiment of the communications system 100 that includes a RAN 104b and a core network 106b that comprise example implementations of the RAN 104 and the core network 106, respectively. As noted above, the RAN 104, for instance the RAN 104b, may employ an E-UTRA radio technology to communicate with the WTRUs 102a, 102b, and 102c over the air interface 116. The RAN 104b may also be in communication with the core network 106b.

The RAN 104b may include eNode-Bs 170a, 170b, 170c, though it should be appreciated that the RAN 104b may include any number of eNode-Bs while remaining consistent with an embodiment. The eNode-Bs 170a, 170b, 170c may each include one or more transceivers for communicating with the WTRUs 102a, 102b, 102c over the air interface 116. In one embodiment, the eNode-Bs 170a, 170b, 170c may implement MIMO technology. Thus, the eNode-B 170a, for example, may use multiple antennas to transmit wireless signals to, and receive wireless signals from, the WTRU 102a.

Each of the eNode-Bs 170a, 170b, 170c may be associated with a particular cell (not shown) and may be configured to handle radio resource management decisions, handover decisions, scheduling of users in the uplink and/or downlink, and the like. As shown in FIG. 1D, the eNode-Bs 170a, 170b, 170c may communicate with one another over an X2 interface.

The core network 106b shown in FIG. 1D may include a mobility management gateway (MME) 172, a serving gateway 174, and a packet data network (PDN) gateway 176. While each of the foregoing elements is depicted as part of the core network 106b, it should be appreciated that any one of these elements may be owned and/or operated by an entity other than the core network operator.

The MME 172 may be connected to each of the eNode-Bs 170a, 170b, 170c in the RAN 104b via an S1 interface and may serve as a control node. For example, the MME 172 may be responsible for authenticating users of the WTRUs 102a, 102b, 102c, bearer activation/deactivation, selecting a particular serving gateway during an initial attach of the WTRUs 102a, 102b, 102c, and the like. The MME 172 may also provide a control plane function for switching between the RAN 104b and other RANs (not shown) that employ other radio technologies, such as GSM or WCDMA.

The serving gateway 174 may be connected to each of the eNode Bs 170a, 170b, 170c in the RAN 104b via the S1 interface. The serving gateway 174 may generally route and forward user data packets to/from the WTRUs 102a, 102b, 102c. The serving gateway 174 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 174 may also be connected to the PDN gateway 176, which may provide the WTRUs 102a, 102b, 102c with access to packet-switched networks, such as the Internet 110, to facilitate communications between the WTRUs 102a, 102b, 102c and IP-enabled devices.

The core network 106b may facilitate communications with other networks. For example, the core network 106b may provide the WTRUs 102a, 102b, 102c with access to circuit-switched networks, such as the PSTN 108, to facilitate communications between the WTRUs 102a, 102b, 102c and traditional land-line communications devices. For example, the core network 106b may include, or may communicate with, an IP gateway (e.g. an IP multimedia subsystem (IMS) server) that serves as an interface between the core network 106b and the PSTN 108. In addition, the core network 106b may provide the WTRUs 102a, 102b, 102c with access to the networks 112, which may include other wired or wireless networks that are owned and/or operated by other service providers.

Figure 1E:
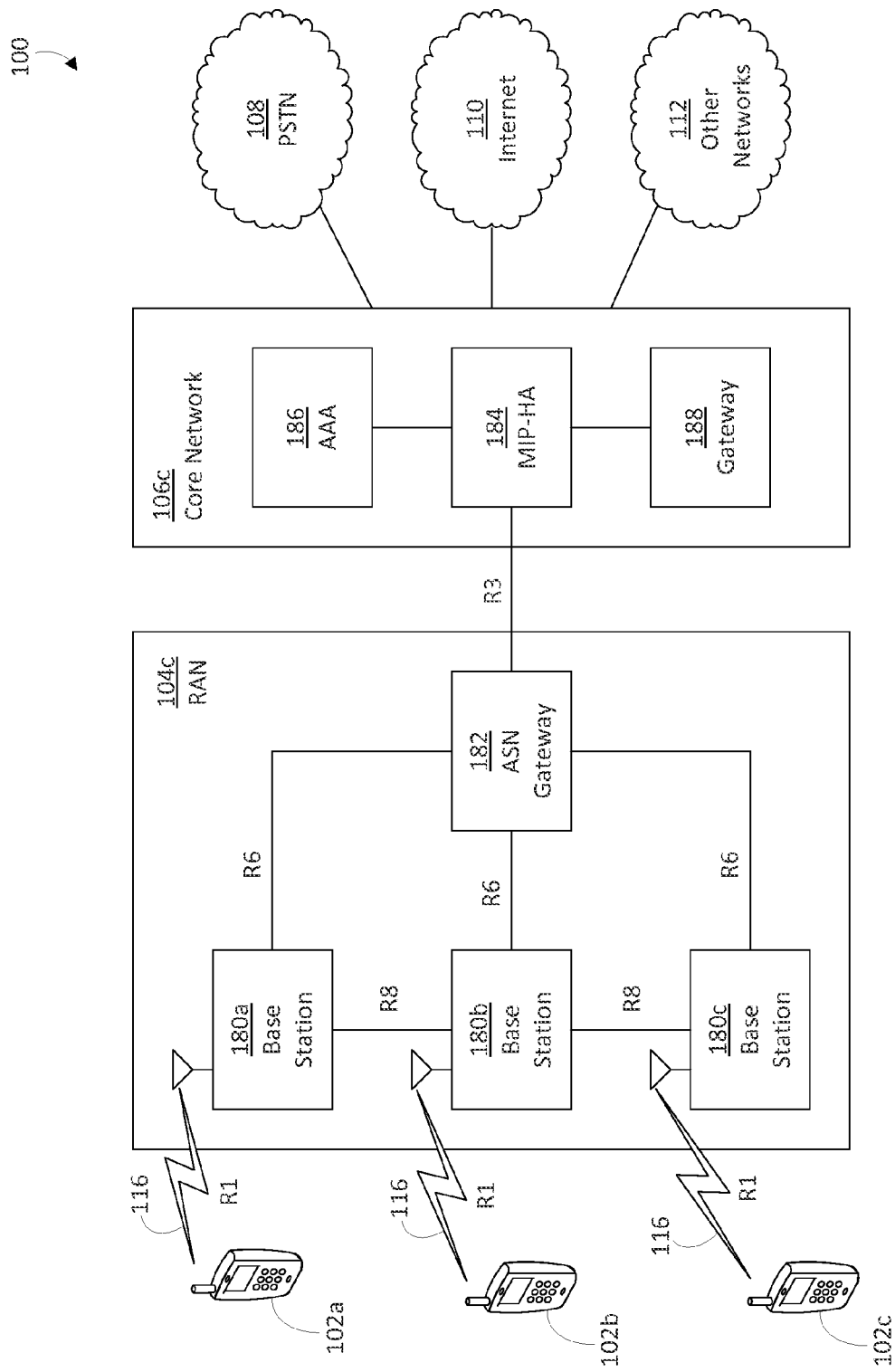
FIG. 1E depicts a system diagram of an example radio access network and an example core network that may be used within the communications system illustrated in FIG. 1A.

FIG. 1E is a system diagram of an embodiment of the communications system 100 that includes a RAN 104c and a core network 106c that comprise example implementations of the RAN 104 and the core network 106, respectively. The RAN 104, for instance the RAN 104c, may be an access service network (ASN) that employs IEEE 802.16 radio technology to communicate with the WTRUs 102a, 102b, 102c over the air interface 116. As described herein, the communication links between the different functional entities of the WTRUs 102a, 102b, 102c, the RAN 104c, and the core network 106c may be defined as reference points.

As shown in FIG. 1E, the RAN 104c may include base stations 180a, 180b, 180c, and an ASN gateway 182, though it should be appreciated that the RAN 104c may include any number of base stations and ASN gateways while remaining consistent with an embodiment. The base stations 180a, 180b, 180c may each be associated with a particular cell (not shown) in the RAN 104c and may each include one or more transceivers for communicating with the WTRUs 102a, 102b, 102c over the air interface 116. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN Gateway 182 may serve as a traffic aggregation point and may be responsible for paging, caching of subscriber profiles, routing to the core network 106c, and the like.

The air interface 116 between the WTRUs 102a, 102b, 102c and the RAN 104c may be defined as an R1 reference point that implements the IEEE 802.16 specification. In addition, each of the WTRUs 102a, 102b, 102c may establish a logical interface (not shown) with the core network 106c. The logical interface between the WTRUs 102a, 102b, 102c and the core network 106c may be defined as an R2 reference point, which may be used for authentication, authorization. IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 104c may be connected to the core network 106c. The communication link between the RAN 104c and the core network 106c may defined as an R3 reference point that includes protocols for facilitating data transfer and mobility management capabilities, for example. The core network 106c may include a mobile IP home agent (MIP-HA) 184, an authentication, authorization, accounting (AAA) server 186, and a gateway 188. While each of the foregoing elements is depicted as part of the core network 106c, it should be appreciated that any one of these elements may be owned and/or operated by an entity other than the core network operator.

The MIP-HA 184 may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional landline communications devices. In addition, the gateway 188 may provide the WTRUs 102a, 102b, 102c with access to the networks 112, which may include other wired or wireless networks that are owned and/or operated by other service providers.

Although not shown in FIG. 1E, it should be appreciated that the RAN 104c may be connected to other ASNs and the core network 106c may be connected to other core networks. The communication link between the RAN 104c the other ASNs may be defined as an R4 reference point, which may include protocols for coordinating the mobility of the WTRUs 102a, 102b, 102c between the RAN 104c and the other ASNs. The communication link between the core network 106c and the other core networks may be defined as an R5 reference point, which may include protocols for facilitating interworking between home core networks and visited core networks.

A millimeter wave (mmW) communication system, for example an mmW mesh network that includes a plurality of nodes configured for mmW communication, may be integrated with a cellular communications system. For example, an mmW mesh network may be communicatively coupled to a cellular communications system, such that one or more UEs (e.g., WTRUs) associated with the cellular communications system may leverage the mmW communications system, for example to send and/or receive data. Such integration may be implemented in accordance with a radio network evolution (RNE) architecture model.

An implementation of integrating an mmW communications network with a cellular communications network may include a cellular system overlay with an mmW system underlay. The cellular system (or layer) may be configured to provide a control framework. The mmW system (or layer) may be configured to provide one or more data pipes that may carry high throughput data, for example. Higher layer control signaling (as well physical layer control) such as system information, paging, random access channel (RACH) access, radio resource control (RRC), and non-access stratum (NAS) signaling (e.g., signaling radio bearers) and/or multicast traffic, may be provided via the cellular layer, for example. The mmW layer may be used as a default for transporting high throughput traffic. The cellular overlay layer may be used to transport low throughput and/or delay sensitive traffic. The mmW layer may have dedicated PHY control signaling.

A UE may initially be connected to a cellular network before receiving and/or transmitting data on an mmW link. Low throughput and/or delay sensitive traffic may be carried by the cellular overlay layer, for example when the network deems it more appropriate. One or more UEs configured with mmW capability may have UL and/or DL cellular capabilities. The cellular layer may be used for mmW network control, connectivity and/or mobility management, for example. The cellular layer may carry L2 and/or L3 control messages, which may alleviate the mmW layer from costs (e.g., resource costs) associated with these functions.

In an example system architecture, an mmW communications system may be connected to a cellular communications system through a mesh backhaul system. The mmW network may include one or more base stations (e.g., small scale base stations) that may be referred to as mmW base stations (mBs). The mBs may be within the coverage area of at least one network device of the cellular communications system, for example an eNB. One or more UEs that are capable of mmW communication, which may be referred to as mmW UE (mUEs), may be configured to operate using mmW and/or cellular links.

An integrated cellular network and mmW network architecture may include a logical and/or physical entity that may be referred to as an mmW gateway (mGW). An mGW may be configured so as to alleviate operational complexity of one or more cellular base stations, for example with respect to mmW control. An mGW node may be implemented as a separate physical entity and/or may be collocated with a network device of the cellular network, for example an eNB or an S-GW. One or more mBs and eNBs may be physically collocated. Such mBs and eNBs may have separate logical functions. An mGW may be configured to provide the network with additional wired, fiber, and/or P2P PoP aside from the eNB, which may provide offload of mmW user traffic from the eNB, for example. In such an example, the eNB may be responsible for providing control for mmW traffic.

Procedures to convey information between the mGW and mUEs may be implemented, for example in accordance with a dense deployment of mBs and/or high access link data rates. One or more mBs may be deployed close to each other, for example in accordance with the relatively short range of mmW transmission and/or due to high path-loss (e.g., penetration loss). The coverage area of an eNB may thus include a high number of mBs. It may be undesirable to establish direct physical connection between each mB and an associated mGW. Procedures may be implemented to convey information between the mGW and one or more associated mUEs. Mesh mmW networking may be implemented, for example, as a candidate solution that may overcome the impracticality of fiber connections, or as a substitute for long mmW links, and may be implemented to encompass a relatively wide area coverage for an mmW communications system.

Figure 2:
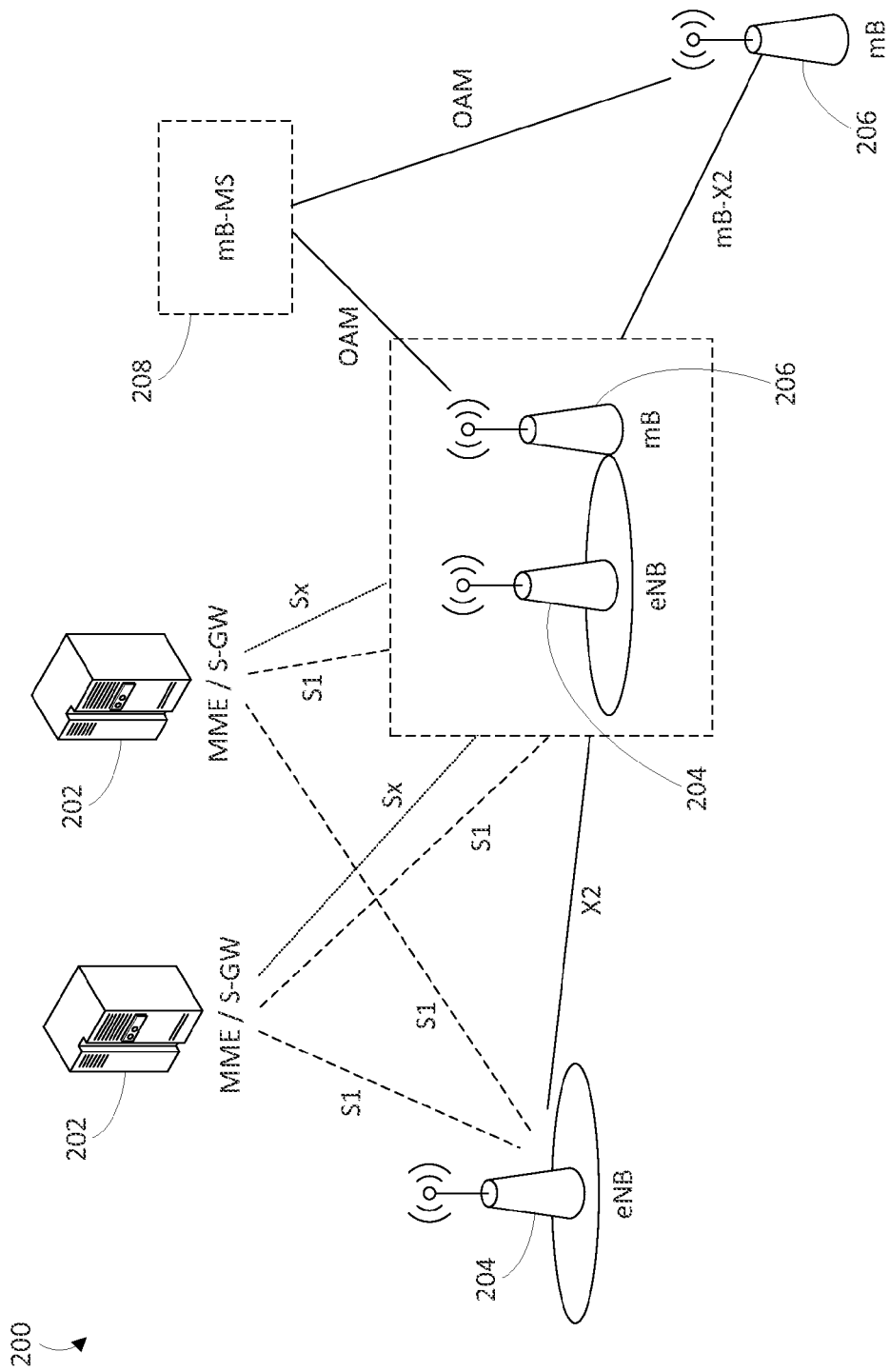
FIG. 2 depicts a block diagram of an example deployment of a cellular communications system and an associated millimeter wave (mmW) communications system.

FIG. 2 depicts a block diagram of an example communications system 200 that includes a cellular communications system and an associated millimeter wave (mmW) communications system. The communications system 200 may include one or more MMEs and/or S-GWs 202, one or more eNBs 204, one or more mBs 206, and an mB management system (mB-MS) 208. The cellular communications system may be, for example, an evolved UMTS terrestrial radio access network (E-UTRAN or Evolved UTRAN). The example architecture of the communications system 200 illustrated in FIG. 2 may be implemented, for example, in accordance with a radio network evolution (RNE) system model. As shown, the communications system 200 includes at least one eNB 204 that is collocated with at least one mB 206, and may be referred to as a collocated deployment.

In a collocated deployment, the collocated mB 206 and the eNB 204 may be assumed to be physically located in a single chassis, such that the mB 206 and the eNB 204 may communicate without the presence of a physical link. The mB 206 and the eNB 204 may be physically the same device, but may be logically defined as two separate functional entities. For example, the eNB 204 may be responsible for LTE RAN operation on the licensed LTE spectrum, and the mB 206 may be responsible for operation in the mmW band, for instance using either LTE or non-LTE radio access technology.

One or more of the mB 206 nodes may include respective logical interfaces to one or more MME/S-GWs 202 and/or one or more neighboring mB 206 nodes, for example via one or more Sx interfaces and/or mB-X2 interfaces.

An Sx interface may support configuration of the mB 206 from an MME 202 node. In an example implementation, the Sx interface may be split into Sx-MME and Sx-U, where Sx-MME may be an interface to an MME and Sx-U may be an interface to an S-GW. In another example implementation, the S1 interface may be extended, for example with additional configuration messages and/or parameters, so as to allow operation and/or management of the mB 206 node.

One or more mB-X2 interfaces may be established, for example between mB 206 nodes. An mB-X2 interface may be implemented, for example, as an optional logical interface between mB 206 nodes. The mB-X2 interface may be split into mB-X2-Control and an mB-X2-Data, for example to carry control plane messaging and user plane messaging, respectively, between mB 206 nodes.

These logical interfaces may operate over any suitable physical interfacing options, and may be configured to operate in accordance with Layer 2 and/or Layer 3 messaging (e.g., IP and/or GTP).

Each mB 206 node may be managed by an associated mB-MS 208, which may provide an operations, administration, and maintenance (OAM) interface, for example to support startup, initial configuration and/or management of one or more mB 206 nodes.

Figure 3:
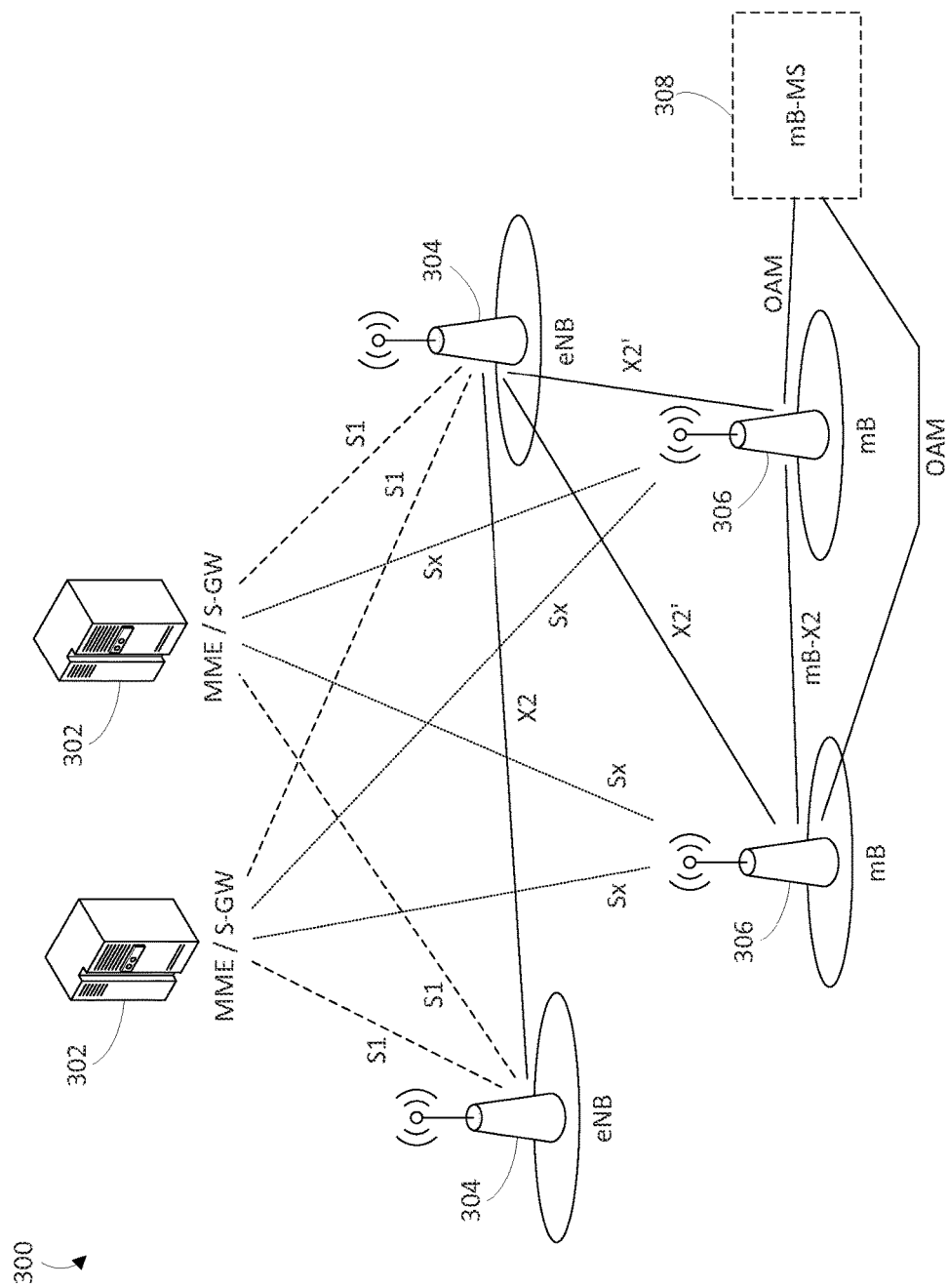
FIG. 3 depicts a block diagram of another example deployment of a cellular communications system and an associated millimeter wave (mmW) communications system.

FIG. 3 depicts a block diagram of an example communications system 300 that includes a cellular communications system and an associated millimeter wave (mmW) communications system. The communications system 300 may include one or more MMEs and/or S-GWs 302, one or more eNBs 304, one or more mBs 306, and an mB management system (mB-MS) 308. The cellular communications system may be, for example, an evolved UMTS terrestrial radio access network (E-UTRAN or Evolved UTRAN). The example architecture of the communications system 300 illustrated in FIG. 3 may be implemented, for example, in accordance with a radio network evolution (RNE) system model. As shown, because there is not an eNB 304 and an mB 306 that are collocated, the communications system 300 may be referred to as a non-collocated deployment.

One or more of the mB 306 nodes may include respective logical interfaces to one or more MME/S-GWs 302 and/or one or more neighboring mB 306 nodes, for example via one or more Sx interfaces, one or more mB-X2 interfaces, one or more X2-C' interfaces, and/or X2-U' interfaces. One or more of these interfaces may be implemented in the E-UTRAN sub-system, for example.

An Sx interface may support configuration of an mB 306 from an MME 302 node. In an example implementation, an Sx interface may be split into Sx-MME and Sx-U, where Sx-MME may be an interface to an MME and Sx-U may be an interface to an S-GW. In another example implementation, an Sx-U interface may be optional, for example where user-traffic for mBs 306 is routed via the eNB 304 to which the mBs 306 are connected.

One or more mB-X2 interfaces may be established, for example between mB 306 nodes. An mB-X2 interface may be implemented, for example, as an optional logical interface between mB nodes 306. The mB-X2 interface may be split into mB-X2-Control and an mB-X2-Data, for example to carry control plane messaging and user plane messaging, respectively, between mB 306 nodes.

An X2-C' interface may be a logical interface that may be established between an mB 306 and an associated eNB 304. An X2-C' interface may be used, for example, for exchanging control signaling for management, and/or for co-ordination and/or configuration between the eNB 304 and the mB 306 nodes. For example, X2-C' messaging may carry configuration for an initial setup. X2-C' messaging may be initially sent over RRC signaling, for example using a cellular connection, and may be subsequently transitioned to control messaging over a backhaul RAT. X2-C' messaging may be carried over a cellular connection after initial setup. This may allow for power savings over the backhaul interface providing, for example by allowing the mmW backhaul link to be turned off completely when there is no traffic present (e.g., X2-U').

An X2-U' interface may be a logical interface that may be established between an mB 306 and an associated eNB 304. An X2-U' interface may be used, for example, for data-plane messaging between the eNB 304 and the mB 306 nodes. In an example implementation, an X2-U' interface may carry RLC PDUs and/or MAC SDUs that may be sent to a UE through the mB 306 node. The X2-U' interface may be a per-UE, per-RB interface. IP packets may be carried over the X2-U' interface.

These logical interfaces may operate over any suitable physical interfacing options, and may be configured to operate in accordance with Layer 2 and/or Layer 3 messaging (e.g., IP and/or GTP).

Each mB 306 node may be managed by an associated mB-MS 308, which may provide an operations, administration, and maintenance (OAM) interface, for example to support startup, initial configuration and/or management of one or more mB 306 nodes. A direct OAM interface may be established between the mBs 306 and the mB-MS 308. An mB 306 may have a connection to an IP network. For example, at startup the mB 306 node may be connected to the IP network and may maintain an independent IP address. This may allow for a direct interface to the mB-MS 308.

Figure 4:
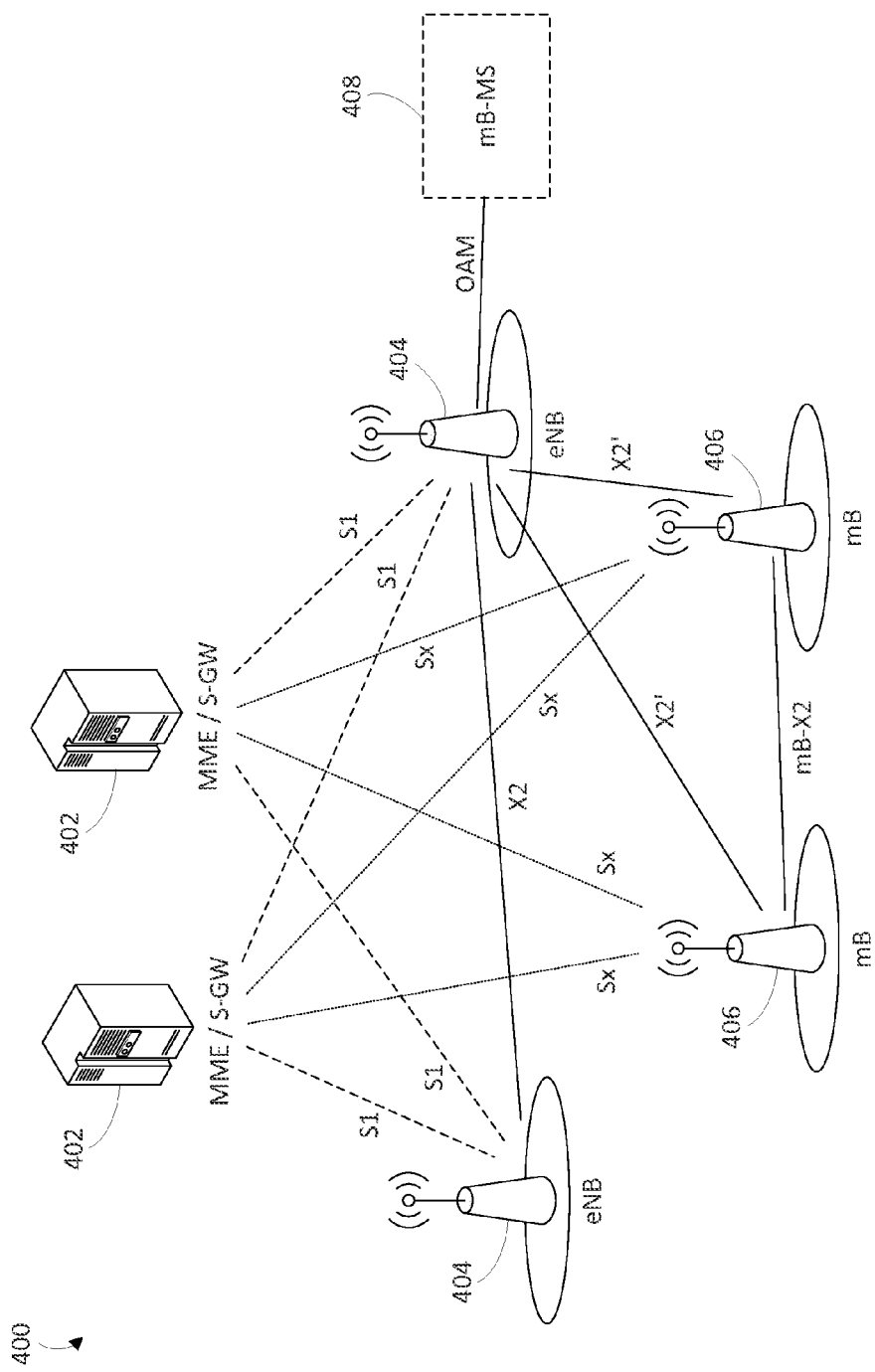
FIG. 4 depicts a block diagram of another example deployment of a cellular communications system and an associated millimeter wave (mmW) communications system.

FIG. 4 depicts a block diagram of an example communications system 400 that includes a cellular communications system and an associated millimeter wave (mmW) communications system. The communications system 400 may include one or more MMEs and/or S-GWs 402, one or more eNBs 404, one or more mBs 406, and an mB management system (mB-MS) 408. The cellular communications system may be, for example, an evolved UMTS terrestrial radio access network (E-UTRAN or Evolved UTRAN). The example architecture of the communications system 400 illustrated in FIG. 4 may be implemented, for example, in accordance with a radio network evolution (RNE) system model. As shown, because there is not an eNB 404 and an mB 406 that are collocated, the communications system 400 may be referred to as a non-collocated deployment.

One or more of the mB 406 nodes may include respective logical interfaces to one or more MME/S-GWs 402 and/or one or more neighboring mB 406 nodes, for example via one or more Sx interfaces, one or more mB-X2 interfaces, one or more X2-C' interfaces, and/or X2-U' interfaces. One or more of these interfaces may be implemented in the E-UTRAN sub-system, for example.

An Sx interface may support configuration of an mB 406 from an MME 402 node. In an example implementation, an Sx interface may be split into Sx-MME and Sx-U, where Sx-MME may be an interface to an MME and Sx-U may be an interface to an S-GW. In another example implementation, an Sx-U interface may be optional, for example where user-traffic for mBs 406 is routed via the eNB 404 to which the mBs 406 are connected.

One or more mB-X2 interfaces may be established, for example between mB 406 nodes. An mB-X2 interface may be implemented, for example, as an optional logical interface between mB nodes 406. The mB-X2 interface may be split into mB-X2-Control and an mB-X2-Data, for example to carry control plane messaging and user plane messaging, respectively, between mB 406 nodes.

An X2-C' interface may be a logical interface that may be established between an mB 406 and an associated eNB 404. An X2-C' interface may be used, for example, for exchanging control signaling for management, and/or for co-ordination and/or configuration between the eNB 404 and the mB 406 nodes. For example, X2-C' messaging may carry configuration for an initial setup. X2-C' messaging may be initially sent over RRC signaling, for example using a cellular connection, and may be subsequently transitioned to control messaging over a backhaul RAT. X2-C' messaging may be carried over a cellular connection after initial setup. This may allow for power savings over the backhaul interface providing, for example by allowing the mmW backhaul link to be turned off completely when there is no traffic present (e.g., X2-U').

An X2-U' interface may be a logical interface that may be established between an mB 406 and an associated eNB 404. An X2-U' interface may be used, for example, for data-plane messaging between the eNB 404 and the mB 406 nodes. In an example implementation, an X2-U' interface may carry RLC PDUs and/or MAC SDUs that may be sent to a UE through the mB 406 node. The X2-U' interface may be a per-UE, per-RB interface. IP packets may be carried over the X2-U' interface.

These logical interfaces may operate over any suitable physical interfacing options, and may be configured to operate in accordance with Layer 2 and/or Layer 3 messaging (e.g., IP and/or GTP).

Each mB 406 node may be managed by an associated mB-MS 408, which may provide an operations, administration, and maintenance (OAM) interface, for example to support startup, initial configuration and/or management of one or more mB 406 nodes. A direct OAM interface may be established between the mBs 406 and the mB-MS 408. An mB 406 may have a connection to an IP network. For example, at startup the mB 406 node may be connected to the IP network and may maintain an independent IP address. This may allow for a direct interface to the mB-MS 408.

Each mB 406 node may be managed by an associated mB-MS 408, which may provide an operations, administration, and maintenance (OAM) interface, for example to support startup, initial configuration and/or management of one or more mB 406 nodes. As shown, the mBs do not have respective direct connections to an IP network, but may establish respective cellular interfaces with an associated eNB 304, for example to obtain initial configuration from the eNB 404. The eNB 404 may establish a connection to the mB-MS 408, and may provide configuration to the mB 406 nodes, for example when the mB 406 nodes attach to the cellular network using respective cellular connections. The mB 406 nodes may directly or indirectly (e.g., via the eNB 406) connect to one or more other E-UTRAN components.

Figure 5:
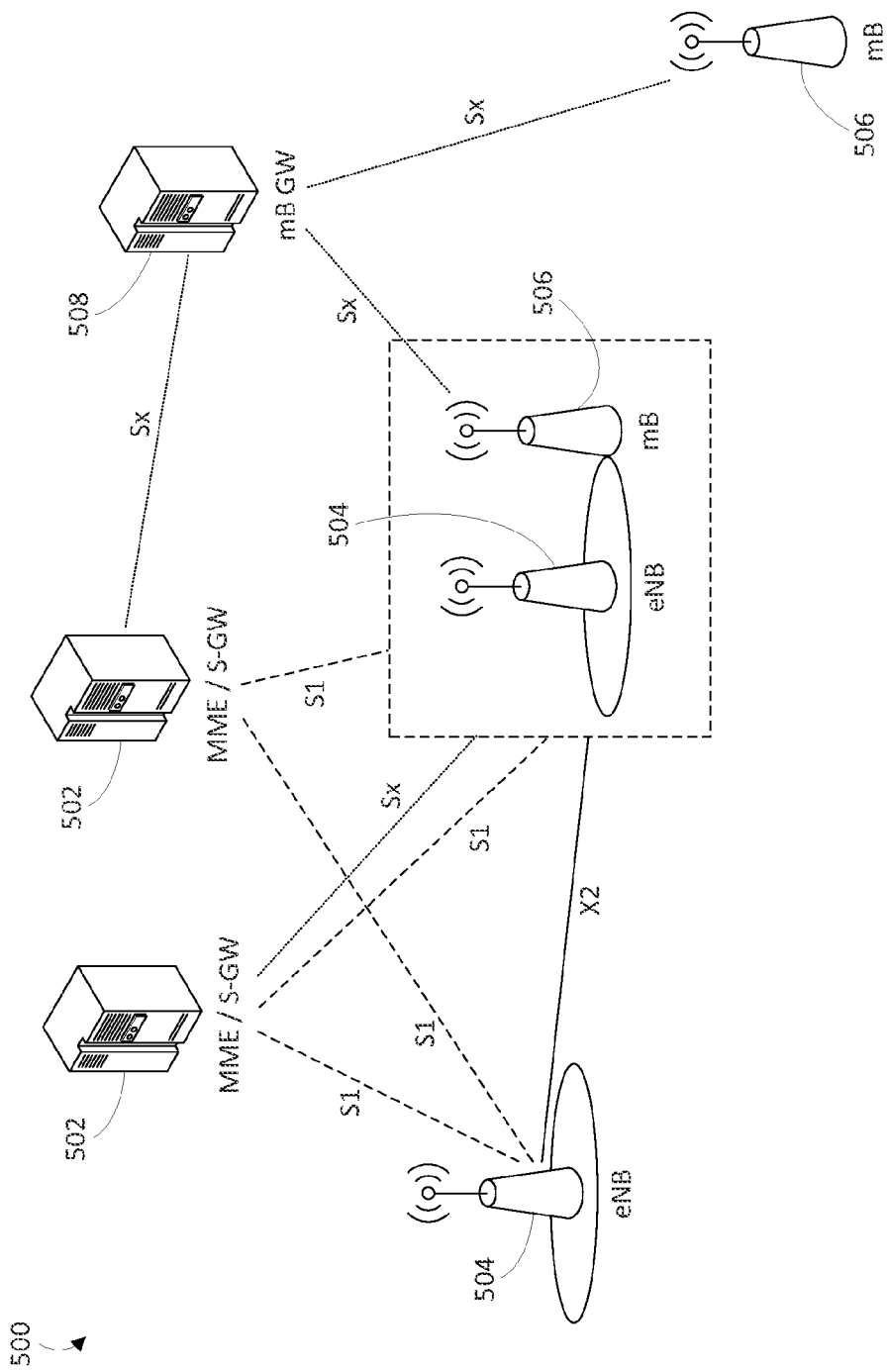
FIG. 5 depicts a block diagram of an example deployment of a cellular communications system and an associated millimeter wave (mmW) communications system having an mmW gateway node (mGW).

FIG. 5 depicts a block diagram of an example communications system 500 that includes a cellular communications system and an associated millimeter wave (mmW) communications system. The communications system 500 may include one or more MMEs and/or S-GWs 502, one or more eNBs 504, one or more mBs 506, and an mB GW 508. The cellular communications system may be, for example, an evolved UMTS terrestrial radio access network (E-UTRAN or Evolved UTRAN). The example architecture of the communications system 500 illustrated in FIG. 5 may be implemented, for example, in accordance with a radio network evolution (RNE) system model. As shown, the communications system 500 includes at least one eNB 504 that is collocated with at least one mB 506, and may be referred to as a collocated deployment.

In a collocated deployment, the collocated mB 506 and the eNB 504 may be assumed to be physically located in a single chassis, such that the mB 506 and the eNB 504 may communicate without the presence of a physical link. The mB 506 and the eNB 504 may be physically the same device, but may be logically defined as two separate functional entities. For example, the eNB 504 may be responsible for LTE RAN operation on the licensed LTE spectrum, and the mB 506 may be responsible for operation in the mmW band, for instance using either LTE or non-LTE radio access technology.

The presence of the mB GW 508 may allow the one or more Sx interfaces between the mBs 506 and an evolved packet core (EPC) to support a large number of mBs 506, for example in a scalable manner. The mB GW 508 may be configured to operate as a concentrator for the C-Plane, for example for the Sx-MME interface. One or more Sx-U interfaces from the mBs 506 may be terminated at the mB GW 508. A direct logical U-Plane connection established between an associated eNB 504 and an S-GW 502 may be used. The mB GW 508 may operate to perform the functions of an mB-MS, for example to support startup, initial configuration and/or management of one or more mB 506 nodes.

Figure 6:
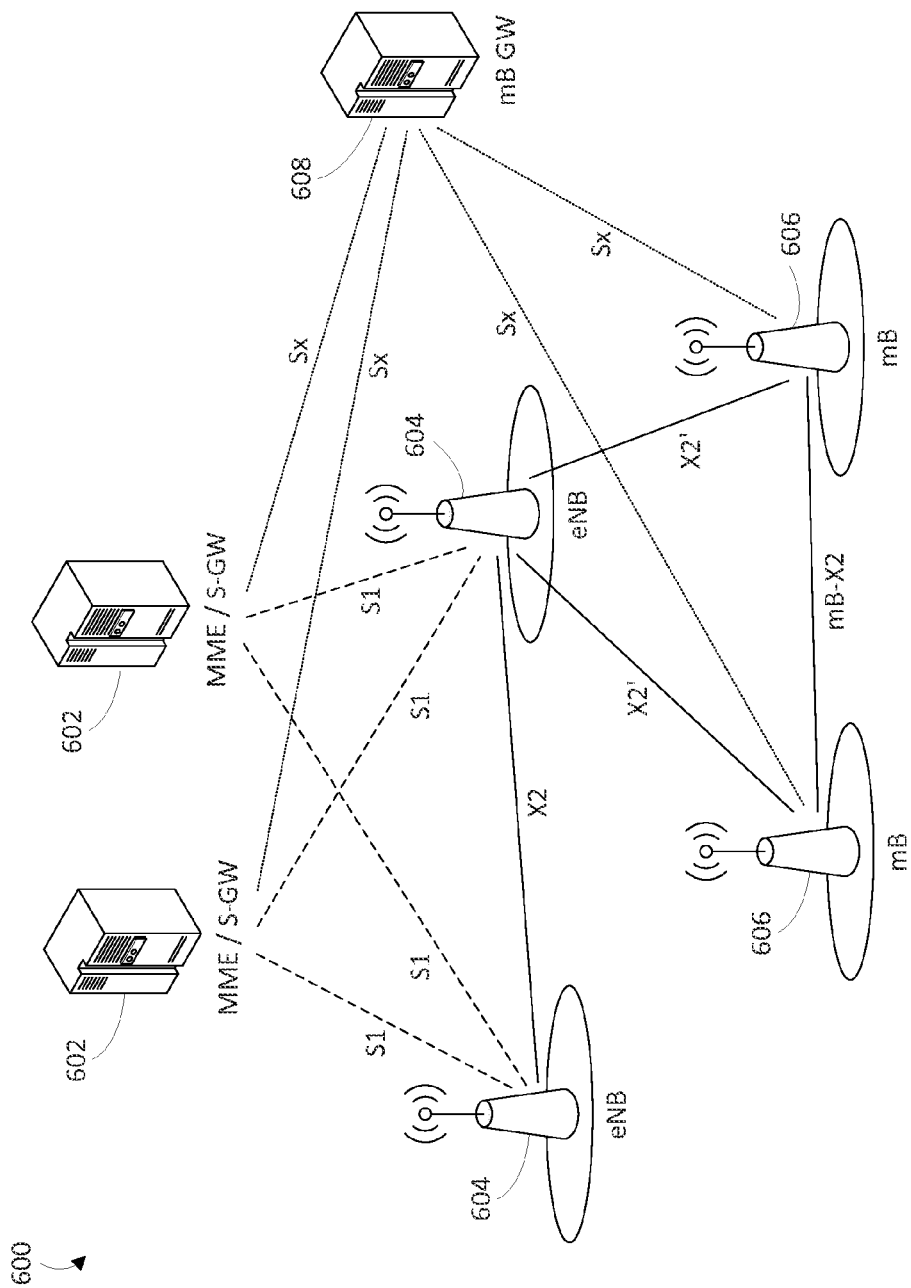
FIG. 6 depicts a block diagram of another example deployment of a cellular communications system and an associated millimeter wave (mmW) communications system having an mGW.

FIG. 6 depicts a block diagram of an example communications system 600 that includes a cellular communications system and an associated millimeter wave (mmW) communications system. The communications system 600 may include one or more MMEs and/or S-GWs 602, one or more eNBs 604, one or more mBs 606, and an mB GW 608. The cellular communications system may be, for example, an evolved UMTS terrestrial radio access network (E-UTRAN or Evolved UTRAN). The example architecture of the communications system 600 illustrated in FIG. 6 may be implemented, for example, in accordance with a radio network evolution (RNE) system model. As shown, because there is not an eNB 604 and an mB 606 that are collocated, the communications system 600 may be referred to as a non-collocated deployment.

The presence of the mB GW 608 may allow the one or more Sx interfaces between the mBs 606 and an evolved packet core (EPC) to support a large number of mBs 606, for example in a scalable manner. The mB GW 608 may be configured to operate as a concentrator for the C-Plane, for example for the Sx-MME interface. One or more Sx-U interfaces from the mBs 606 may be terminated at the mB GW 608. A direct logical U-Plane connection established between an associated eNB 604 and an S-GW 602 may be used. The mB GW 608 may operate to perform the functions of an mB-MS, for example to support startup, initial configuration and/or management of one or more mB 606 nodes.

Communications between an mUE and an associated eNB (e.g., 204, 304, 404, 504, or 604) and/or an associated mGW (e.g., 508 or 608) may be achieved through one or more mBs that are interconnected and may form an mmW mesh network. Mesh backhaul may extend from an eNB and may require more than one hop. In an mmW mesh network, a large number of mBs may be within range of one or more other mBs, which may provide many possible routes. In such an mmW mesh network, each mB may be able to reach one or more neighboring mBs using wireless mmW backhaul links, for example when a wired backhaul link is not available.

Backhaul links (e.g. wired or wireless) between different mBs (e.g., mB to mB), and between one or more mBs and other network devices (e.g., mGW nodes) may form a multi-hop mesh network, for example such that long backhaul links may not be required. This may reduce capital expenditure. Backhaul reliability may be achieved via multiple paths. Backhaul links between an mGW and one or more mBs may be significantly different from the backhaul links between different mBs (e.g., mB to mB), for example in terms of physical medium used, such as mmW wireless links, fiber-optic links, or the like.

Link adaptation techniques may be employed in the backhaul (e.g., HARQ and fast AMC), such that each link may operate nearer to a corresponding channel capacity. This may support greater spectral efficiency. For example, each node in a routing path of a packet, or part of a packet or a bundled packet, may use an estimated channel quality to select a most appropriate MCS for a desired TP and a max number of HARQ re-transmissions.

AMC may be slow and conservative, and HARQ may be omitted, for example to support lower latency and/or lower overhead. For example, a minimum expected link quality in a full routed path of a packet may be used to define an MCS so that there is a high probability of delivery without one or more nodes (e.g., each node) in the path re-encoding the packet to better match the link capacity of the links used to deliver the packet from mB to mB.

In an example, one or more mesh nodes may employ amplify-and-forward transmission, such that they amplify a received analog signal and forward the amplified signal to a neighbor mesh node in the route. A determination of an amplification factor may be done locally (e.g., at each node), and may depend on one hop backward and forward channels.

In another example, one or more mesh nodes may employ decode-and-forward transmission, such that each node decodes the packet and forwards it to a next hop in the route. During a decoding and re-encoding process, one or more errors in the packet (e.g., errors created due to noise accumulation during AF transmission) may be corrected. The MCS of the packet may not be affected, such that rebundling may not be required, and such that low-latency transmission may be achieved.

In another example, an eNB may determine the MCS of the packet and may inform one or more nodes that pass the packet through the mesh network. This may be valid for both amplify-and-forward and decode-and-forward transmission. The eNB may obtain channel conditions, buffer conditions, etc. from one or more nodes in the network, and may calculate a best possible MCS. This information may be conveyed by one or more mesh nodes to the eNB, for example through one or more cellular layer control messages such as PUCCH. The MCS of the packet may be conveyed to the nodes via PDCCH.

A backhaul link and access link may use the same frequency resources, and may enjoy benefits from trunking efficiency and/or directional transmission. Signal transmission from an mGW to an mUE may involve route determination between the mGW and the mUE, including one or more mBs in between, such that joint RRM of backhaul and access links may be implemented. In other words, in a scenario where access and backhaul may simultaneously contend for at least some of the mmW spectrum, routing and/or scheduling may be considered jointly.

If separate bands are available in an mmW band, for example if the 60 GHz unlicensed band is channelized into several 2 GHz channels, one or more orthogonal bands may be utilized both for access links and backhaul links. Utilizing orthogonal bands between access links and backhaul links may separate short time scale RRM aspects of these links, but may slow channel assignments, for example if backhaul and/or access are yet to be negotiated. Per channel load information may be signaled to an mB-MS (e.g., over cellular radio resources), such that per link channels may be assigned to access or to backhaul.

A channelized band (e.g., 60 GHz) may designate one or more channels in one or more links as backhaul or as access. These designations may be changed, for example on a frequent basis. For example, one or more mBs may sense an environment for availability of channels for access and/or backhaul, and may make designations autonomously. A channelized band (e.g., 60 GHz) may designate one or more channels in one or more links as joint backhaul and access.

Separate bands (e.g., 60 GHz and E-band) may be used for access and backhaul, respectively. This may separate access and backhaul radio interactions. The separate bands may be used for special links, for example links expected to have particularly heavy loads. For example, mGW to and/or from mB links may use E-band, while mB to and/or from mB links may use 60 GHz.

Links between mBs and an mGW may be of various forms, for example mmW (e.g., 60 GHz, E Band), fiber, copper, etc., such that a heterogeneous network is defined. The same mmW spectrum may be used for both backhaul and access links, for example due to the high directionality of mmW beams. In such an example, a joint backhaul and access link RRM for the mmW system may be implemented. The presence of a LOS path on one or more backhaul links may be beneficial. The support of limited NLOS may be desirable. This may be accomplished by steering beams around lossy obstructions, for example people. One or more backhaul links may provide respective attributes and/or capabilities to a backhaul routing protocol. Such attributes and/or capabilities may include, for example, an average link capacity, an average latency, an average QoS capability, an average SINR, an average availability, a reliability, etc., which may be denoted as Cij. A mesh backhaul routing protocol (MBRP) may be aware of corresponding states of one or more backhaul links in a system, along with their respective attributes.

Millimeter wave backhaul links may not be static, in contrast with the backhaul links of typical cellular systems. Mesh backhaul (mmW mesh backhaul) may provide one or more alternative routes. If a need for an mmW backhaul link is established dynamically, an mmW backhaul link may be setup on the fly. This may provide an ability to use resources where and when required, and may allow for efficient sharing of resources, for example between access and backhaul. This may allow for more aggressive DRX and/or power save schemes that may not be feasible in typical backhaul networks.

In an example implementation, it may be possible to deploy mBs (e.g., deployed on lamp-posts) configured to operate above the ground (e.g., approximately 3 m to 6 m above the ground). Such mBs may encounter comparatively few obstacles from mB to mB, even when deployed below rooftop. The mBs may communicate with each other, at least via mmW layer, and may form a mesh network. One or more mBs (e.g., in close proximity to an associated eNB or mGW) may forward traffic to these nodes. Access traffic from multiple mBs may ultimately be funneled to one or more backhaul links. The backhaul links may enjoy better overall capacity, for example due to better and/or higher placement, the use of larger antennas at one or both ends of a link, and/or less loss that may be due to beam tracking.

A cellular communications system may have a degree of control over an mmW network. The degree of control exerted by the cellular layer may be configured at various levels. The cellular layer may not have information about instantaneous mB to mB channel gains, interference, congestion, etc.; but may have statistical knowledge about them. For example, semi-static and/or slowly changing measurements may be reported to the network regarding the mmW layer. This information may be conveyed by one or more mBs to an associated eNB through periodic signals in the cellular layer, for example.

Utilizing the above-discussed information obtained from the mmW system, the cellular layer may influence one or more routing protocol decisions with the long-term routing statistics. By combining long-term network conditions obtained from the cellular layer (that might be in the form of a suggested route to be followed and/or one or more route segments to avoid) along with the instantaneous channel, traffic, etc. conditions at hand, the mBs may decide a next step (e.g., a next mB) in the route. One or more mBs may be configured to periodically report average link qualities, availabilities, and/or interference measures to one or more neighboring mBs, and/or access link loads, to the cellular layer. The cellular layer may provide suggested routes to the mB mesh network, for example based on such information. The mB mesh network may use these routes to bias one or more short term routing decisions towards those provided by the cellular layer. The suggested routes may be on a per UE-traffic class basis, for example.

The mBs of an mmW mesh network Node (mB) may be configured with various capabilities (e.g., the same or different capabilities on a per mB basis). For example, one or more mBs may be configured to operate in decode-and-forward mode with buffering capabilities. One or more mBs may be configured with joint reception and transmission capability by forming multiple simultaneous beams. For example, each mB may be configured to support multiple Rx beams or multiple Tx beams at the same instant (e.g., substantially concurrently). Each mB may be configured to employ a degree of spatial separation via beam forming, for example through multiple antennas per mB or through supporting multiple beams from an antenna array.

One or more mB may be configured with multiple Rx beams that may receive different data from different sources. The different sources may be a mixture of access and/or backhaul link traffic. One or more mB may be configured with multiple Tx beams that may transmit different data to different receivers. The different receivers may be a mixture of access and/or backhaul link traffic. A routing algorithm may be implemented to be compatible with this feature.

An mB may be configured with multiple antenna arrays, switched arrays of horns, etc. The mB may have physically separate arrays for Tx and Rx, or the arrays may be shared. If an mB is configured with separate arrays for Tx and Rx, the mB may be configured not to perform Tx and Rx operations at the same time in the same band. Routing decisions may take this into account, such that routing may not assume that an mB may Tx and Rx at the same time in the same band. One or more mBs may have recent channel state information (CSI) pertaining to the links of one or more neighboring mBs (e.g., first hop mBs). One or more mBs may employ AMC and/or HARQ with one or more other mBs, for example an mB to which one or more packets may be routed in a next hop.

An mB may be configured to screen one or more channels periodically, for example to identify mB nodes added to the system. Periodicity and configuration procedures of the channel screening may be implemented. One or more mBs may be configured to perform packet re-segmentation and/or bundling. One or more routing schemes and/or RRM may be optimized accordingly. In this way, one or more data flows (e.g., for different UEs) may be aggregated in one or more backhaul links. The one or more data flows may be aggregated differently as the flows traverse the network.

An mB may be deployed in a collocated or a non-collocated location with respect to an associated eNB. When an mB is installed, the mB device may be packaged with an mB identification (mB ID). The mB ID may be used to register and/or authenticate the mB in the network, for example when the mB is powered on. When an mB is powered up on a network, information may be provided to an operator of the network. This information may be parameters including a location of the mB device installation, a list of mB subscribers (e.g., registration data), access control restrictions that mB device is to be operated in accordance with, etc. Access control information may be in the form of a subscription validation list, a subscriber's authentication preferences, policy parameters, and so on. The radio parameters of the mB may be set to a default configuration when the mB is powered on.

After being powered up, the mB may interface with an associated mB-MS (e.g., during an mB setup procedure). The mB may obtain configuration parameters (e.g., from the mB-MS) that may include one or more of: frequencies for DL and/or UL; a scrambling code list; a radio channel bandwidth that may be provided during a booting procedure by an operator over a backhaul link; a geographic location, routing and/or service area code information; a list of neighboring mBs; a physical cell ID; and one or more RF parameters (e.g., pilot and maximum data power, and the like).

An mB may be configured to calculate some of these configuration parameters, for example using information on the macro-cell layer that may be provided by the operator, and/or from information on the mB layer provided by the installer and/or user of the mB (e.g., registration data). Depending on the capabilities of the mB, this configuration information may be provided to the mB either directly through connection to the mB-MS, or may be provided to the mB via an associated eNB.

Figure 7:
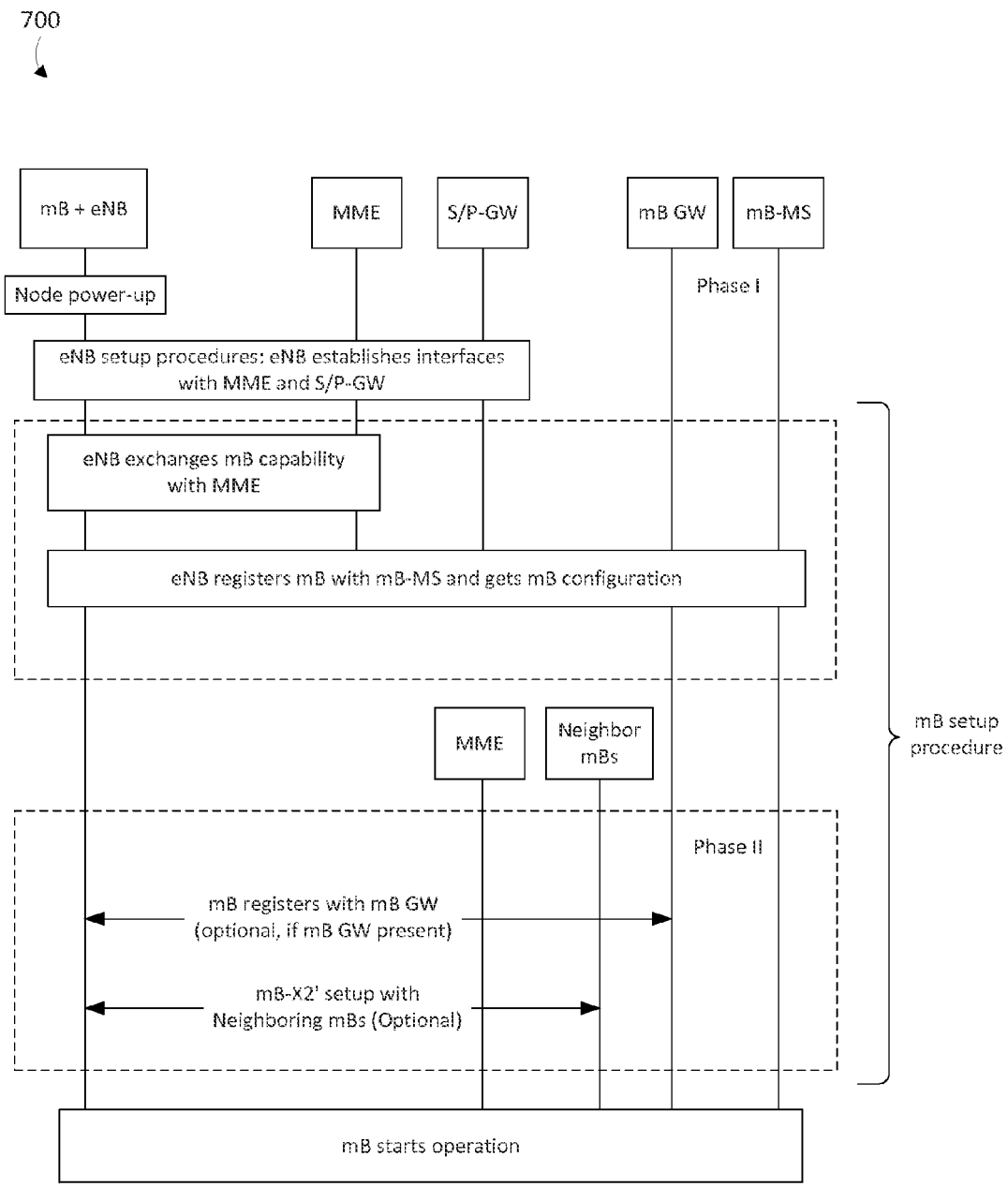
FIG. 7 illustrates an example setup procedure for an mmW base station (mB) device in a collocated deployment.

An mB may be installed in a collocated deployment with an associated eNB device. When a collocated mB is powered up, or when an mB starts up with a connection to an IP network, the mB may connect to an associated mB-MS. Through communication with the mB-MS, the mB may be authenticated and/or registered into the system as an operative device (e.g. over an OAM interface), may obtain configuration parameters, and the like. FIG. 7 illustrates an example setup procedure 700 for an mB that is collocated with an associated eNB device.

An mB may be installed in a non-collocated deployment, for example as described herein. Upon being powered on, a non-collocated mB may be configured to interface with an associated mB-MS. In an example, the mB may have a direct interface to the mB-MS. The mB may have a connection to an IP network, such that the mB node may be connected to the IP network at startup, and may maintain an independent IP address. This may allow the mB to establish a direct interface to the mB-MS. In another example, the mB may interface with the mB-MS via an associated eNB. The mB may not have a direct connection to an IP network, but may have a cellular interface that it may use, for example, to obtain initial configuration from the eNB. The mB may connect to the mB-MS, and may provide configuration information to the mB node, for example when the mB attaches to the network using the cellular connection. An mB node may directly or indirectly (e.g., through the eNB) connect to one or more other E-UTRAN components.

An mB may be configured to perform eNB discovery, for example when the mB is powered on (e.g., during an mB setup procedure). In an example, the mB may have cellular capabilities and may perform cell selection to discover a suitable eNB, for example based on one or more of eNB capabilities, signal strength, an operator white list, a list of PLMNs supported, etc. The suitability of an eNB may be determined, for example, by reading eNB capabilities sent on the system information that may include one or more of back-haul RATs supported, back-haul capabilities, a capacity, a load, a QoS supported, and the like. In another example, the mB may discover the eNB by using backhaul RAT discovery procedures, for example one or more beacons on 802.11 ad with eNB indication.

Figure 8:
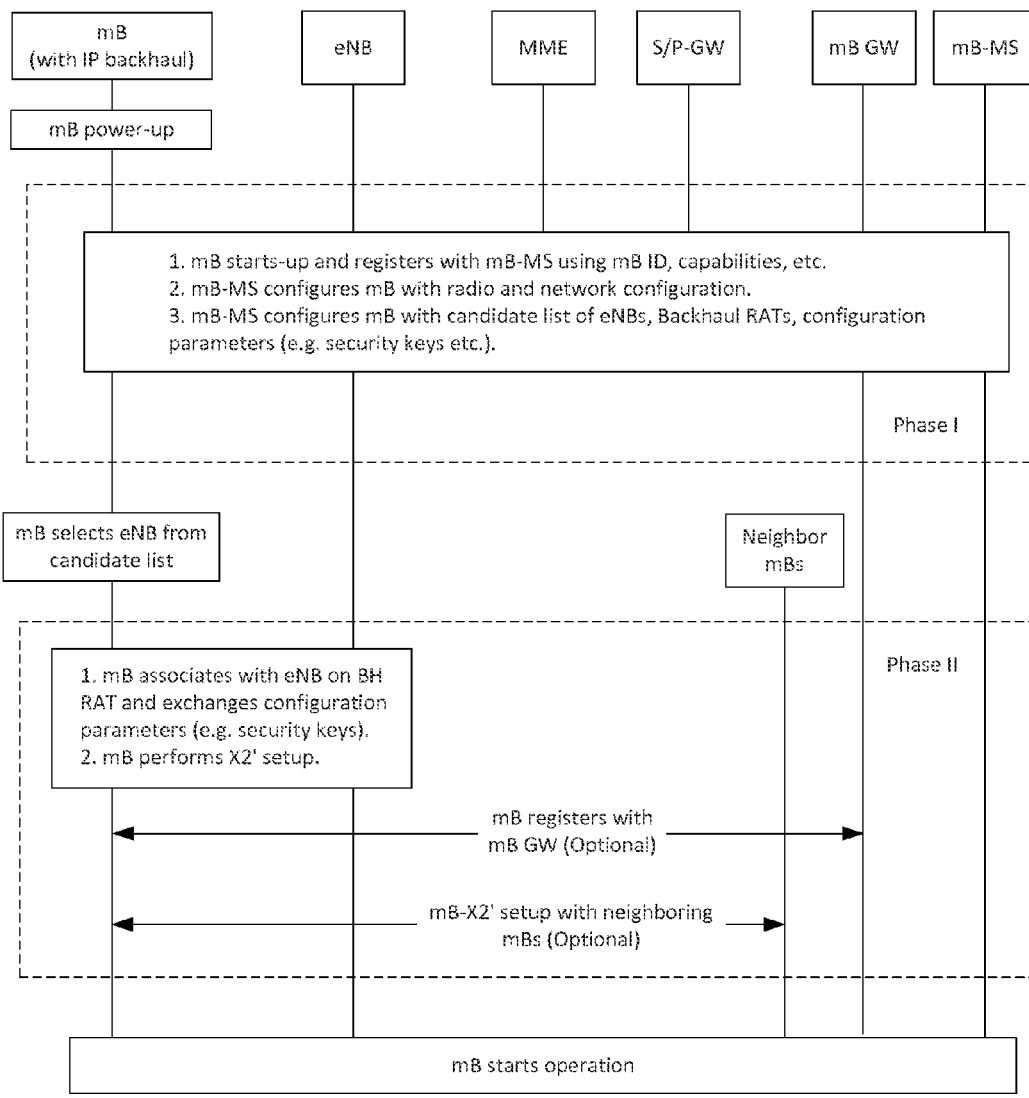
FIG. 8 illustrates an example setup procedure for an mmW base station (mB) device in a non-collocated deployment.

FIG. 8 illustrates an example setup procedure 800 for an mB that installed in accordance with a non-collocated deployment. The mB may have a direct interface to an associated mB-MS. The mB may perform mB start-up and initial configuration procedures using a direct connection to an IP network, for example. The mB may obtain mB-MS configuration information directly. The configuration information may include one or more of a candidate list of eNBs that the mB may choose from based on signal strength, eNB back-haul RAT options, eNB back-haul RAT capabilities, and the like.

Figure 9:
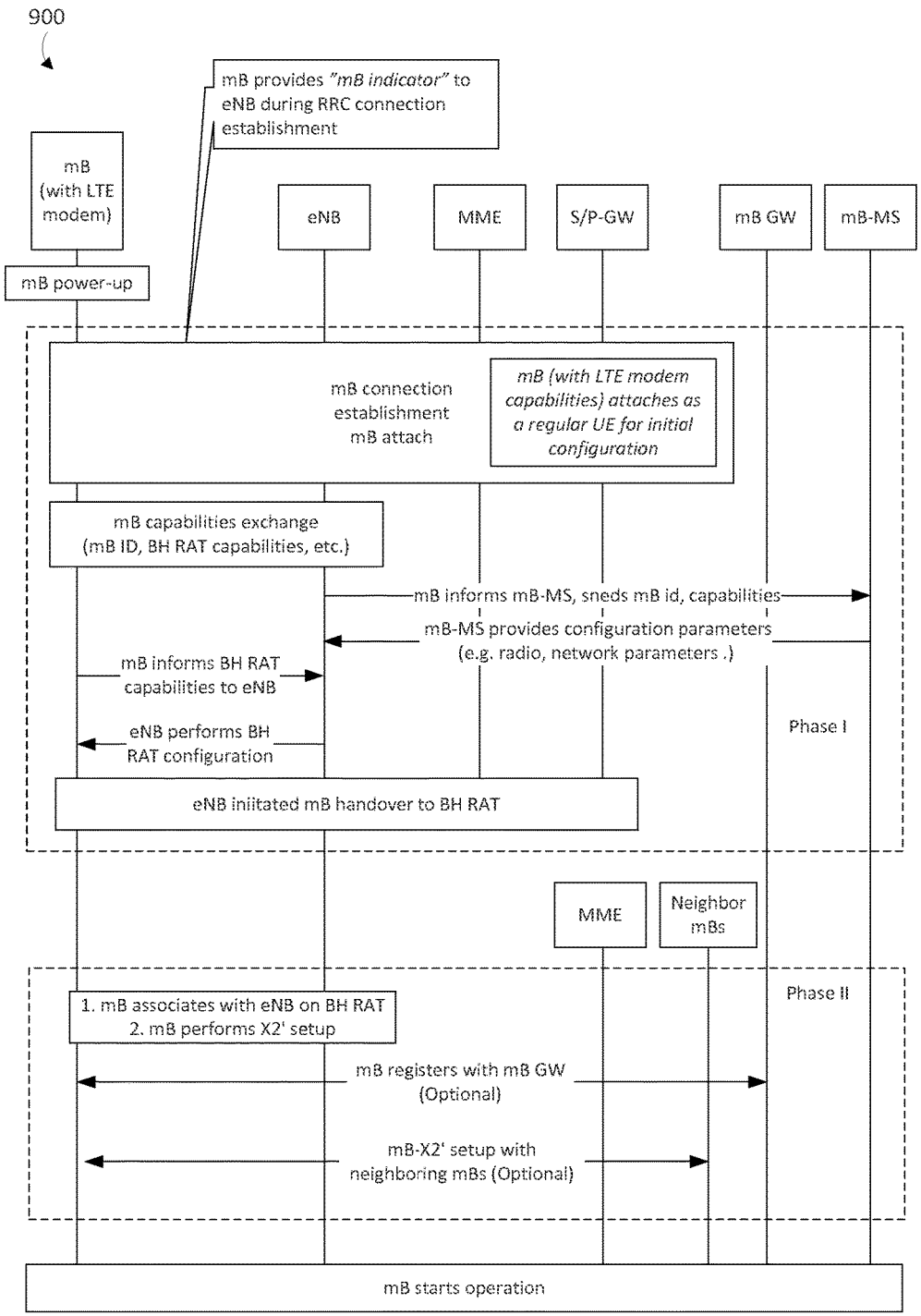
FIG. 9 illustrates another example setup procedure for an mmW base station (mB) device in a non-collocated deployment.

FIG. 9 illustrates an example setup procedure 900 for an mB that installed in accordance with a non-collocated deployment. The mB may have an indirect interface to an associated mB-MS (e.g., via an associated eNB). The mB may perform mB start-up and initial configuration procedures using cellular discovery of eNB, for example. The mB may select a suitable eNB, for example based on suitability criteria. Such suitability criteria may include one or more of received signal strength, eNB back-haul RAT options, eNB back-haul RAT capabilities, and the like. The eNB may advertise its capabilities using broadcast messaging, for example system information in a cellular system, or beacons in an 802.11 ad system. The eNB may advertise its capability to operate as a back-haul eNB, for example such that an mB may recognize the eNB as a candidate eNB. The mB may obtain mB-MS configuration information indirectly. For example, the mB-MS may send configuration to the eNB, and the eNB may configure the mB based on this information, for example using RRC signaling. The mmW transmission capability of the mB, for example including transmission power, antenna gain. Tx range-capacity data, etc., may be exchanged with the eNB. The eNB may use this information in a recommendation process of mB neighbor candidates to one or more other mBs.

After the initial start-up procedures for the mBs of an mB network are carried out, a capacity of the mB backhaul system may be determined. The respective deployment scenarios of the mBs (e.g., co-located and non-collocated mB and eNB) may provide different mesh connectivity options among the mBs comprising a backhaul network. The backhaul capacity information (e.g., respective capacity of each mB to mB link) may be integral to the backhaul-access link RRM and/or to corresponding routing protocols.

Figure 10:
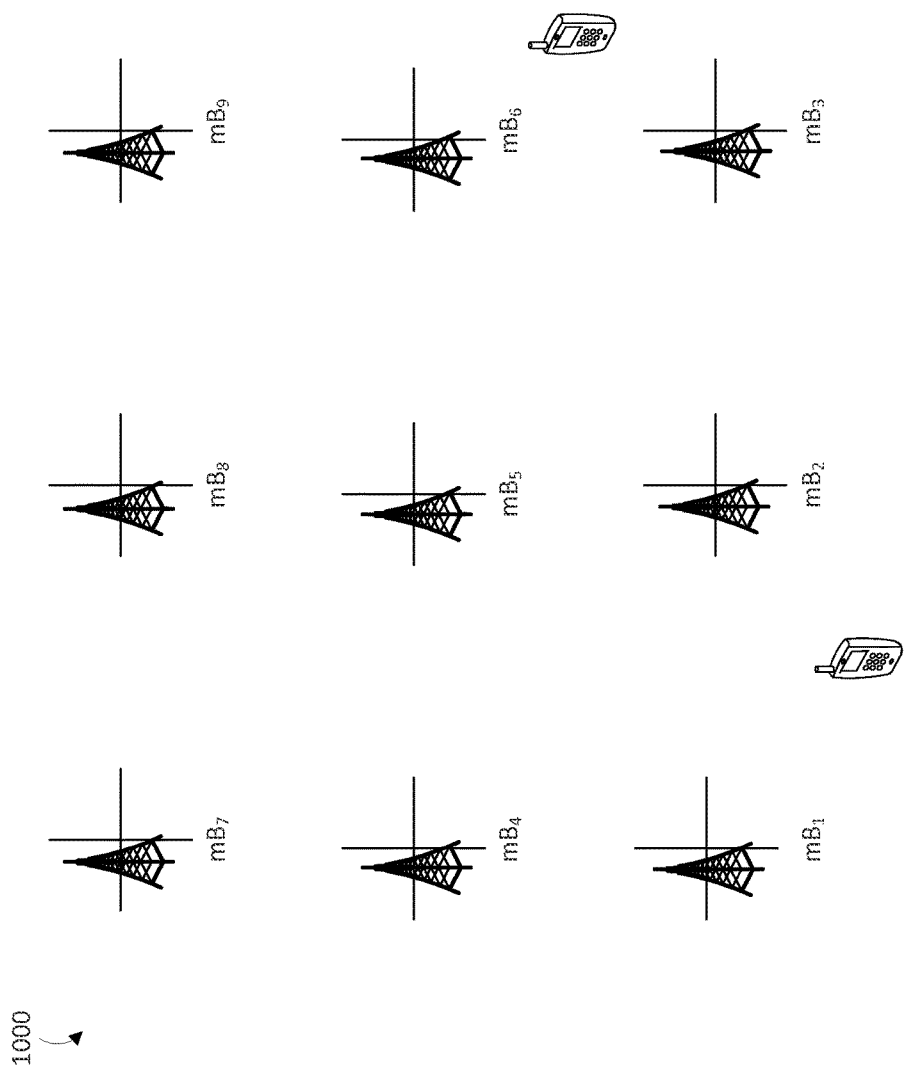
FIG. 10 depicts a block diagram of an example mB mesh backhaul system.

After the respective initial start-up procedures of the mBs in the mesh backhaul system are completed, the mB to mB link capacity may be determined, for example by measuring respective signal powers and/or interference powers between the mBs for possible Tx and/or Rx beam combinations. This process may be performed with aid from the cellular system. This information may be used to initiate mB to mB link establishment and/or may be input into a routing algorithm. FIG. 10 depicts a block diagram of an example mB mesh backhaul system 1000, with initial link measurement.

In an example procedure of admitting a candidate mB into an mB mesh, each candidate mB may obtain an initial mesh neighbor candidate set. An associated eNB may be non-collocated with respect to an associated mB-MS. In an example of obtaining this set, the eNB may inform the candidate mB regarding the locations and/or respective distances of one or more the neighbor mBs (e.g., mB IDs and corresponding geographic locations) that are available and may be willing to establish connections in order to form the mesh. Respective directions of locations of one or more neighbor mB nodes may be incorporated into the location information.

In another example, a candidate mB may attempt to decode respective signals transmitted by one or more neighbor mBs (e.g., beacons) in order to obtain basic information (e.g., location, mB ID, etc.). The candidate mB may perform this, for example, by sweeping its receive beam and/or by employing omni-directional reception. Upon identifying one or more potential neighbor mBs, the candidate mB may inform the eNB about these nodes (e.g., via a candidate neighbor list). The eNB, based on capability information received from one or more other mBs, may send acknowledgment information to the mB. The acknowledgement information may indicate whether the mB should consider the mBs in the list as potential neighbors or not. The capabilities of one or more mBs in the set, such as maximum transmission capacity, etc., may not be sufficient for the mBs to be considered as candidate mesh neighbors.

In another example, the mB may attempt to decode the respective beacons of one or more neighbor mBs, for example by utilizing location information obtained by the eNB. Depending on the neighbor mB location information, the mB may narrow and/or refine its receive beams in this direction and/or in one or more other directions (e.g., adjacent directions).

The admission of a candidate mB into an mB mesh network may be associated with the establishment of an average signal strength (e.g., propagation losses plus antenna gains) of the candidate mB relative to one or more (e.g., each) of the neighboring mBs, when the neighboring mBs have their beams pointed in respective directions that would be used to communicate with each other.

For each such link, interference caused by transmission to and/or from the candidate mB may cause interference to one or more other neighbor mBs. This interference may depend, for example, on the propagation channel and on the respective directions that one or more neighbor antennas are directed. For each such transmission, there may be $KT=K_1+K_2+\ldots+K_M$ interference measurements, where $K_M$ may be the number of possible pointing directions for mB M. For analysis of a backhaul network, the pointing direction of the antennas of one or more neighbor mBs may be towards one of a limited number of other mBs. In contrast, for an access link analysis, the direction of the access link may be drawn from a much larger set of other mBs.

To illustrate, an example mB signal and/or interference measurement procedure for a mesh mB backhaul system is described. A deployment scenario of non-collocated mBs with cellular connection capabilities, as described herein, is considered. An initial procedure for an mB to be admitted to the mesh network is considered.

A candidate mB (e.g. a device that desires to become an mB) may first connect to an associated cellular network (e.g., in a manner similar to a UE) and may request to join the mmW network. The candidate mB may read SIB information, for example to determine whether the eNB supports an mmW layer and/or layers, and may extract minimum requirements of an mmW mesh layer. Such minimum requirements may include, for example, one or more mmW bands, a minimum data rate, a Tx power, an antenna gain, a number of simultaneous Tx, a number of simultaneous Rx, and the like.

The candidate mB may check these requirements against its own capabilities. If satisfied that the requirements will be met, the candidate mB may make a request (e.g., via RRC signaling) to join the mesh network. The candidate mB may send its mB-ID. The request may include other information, for example location coordinates, that may help an associated eNB decide whether the approximate location of the candidate mB may be beneficial.

The eNB (e.g., an mB-MS) may deny the request, may request mB capability class information, or may initiate HO to another eNB. An HO may be due, for example, to eNB capabilities, PLMN exclusion, etc. The eNB may inform an associated mB-MS regarding the HO decision. The eNB may convey information regarding one or more preferred eNBs obtained from the candidate mB to the mB-MS. The candidate mB may select the preferred eNBs based on one or more criteria, for example received signal strength, support of mmW, etc.

The candidate mB may send the eNB (e.g., the mB-MS) the mB capabilities information and/or the mB-ID of the mB, for example if the mB-MS responds with the request.

The eNB (e.g., the mB-MS) may authenticate the mB-ID of the candidate mB. One or more UE authentication procedures (e.g., AS and NAS) may be applied for authentication, for example.

The candidate mB may obtain a candidate mesh mB neighbor list, for example in accordance with an initial mesh neighbor candidate set as described herein.

The eNB may deny the request or may proceed to test the candidate mB for conformance. The eNB may initiate beam acquisition procedures, for example as if the candidate mB was a UE requesting mmW resources, with one or more mBs in the mmW network (e.g., including the eNB if it is co-located with an mB). Before initiating the beam acquisition procedure, the eNB may inform one or more mBs in the candidate set regarding the intent of the candidate mB to perform beam acquisition procedures with the one or more mBs. The information conveyed may be used in a beam refinement procedure between one or more of the mBs. The information elements may include, for example, a beam acquisition start time, a duration of beam refinement, a number of beams to be tested, etc.

If initial beam acquisition is successful, one or more data rate and/or link stability measurements of the link may be made. An enhanced mmW neighbor list may be created. The candidate mB may enter a mode of frequent updates to the neighbor list. In addition to link qualities, historical traffic patterns and/or historical backhaul load beyond the neighbor list may influence the preferred location of the candidate mB and may be included in the enhanced neighbor list.

Deployment aid information may be sent to the candidate mB. The deployment aid information may be in the form of suggested new approximate coordinates of the candidate mB, such that one or more other mBs may be added to the neighbor list, for example. The deployment aid information may be in the form of feedback of signal strength over small candidate mB position changes, for example to help avoid shadowing of small fixed objects like lampposts.

The candidate mB and the mB-MS may negotiate the physical position of the candidate mB, for example by frequent updates of the deployment aid information. In positions and/or orientations acceptable to the network, the candidate mB may request an End of Position Negotiation.

After a physical position and/or orientation of the candidate mB is fixed (e.g., after an ACK of an End of Position Negotiation request), the mB-MS may coordinate a measurement campaign between the candidate mB and one or more mBs in the enhanced mmW neighbor list, as described herein. During this process, a beam refinement stage may be entered between each mB in the list and the candidate mB, in which the beam directions may be further refined, for example to maximize signal strength in the desired Rx.

One or more quiet periods may be forced (e.g., sparsely) into one or more nearby mBs and/or mUEs, so that one or more better signal strength measurements (and variability) for all the mB to mB links, on a per beam direction basis, may be made, for example as described herein. The eNB may coordinate the scheduling of each mB it is attached to, in order to schedule the signal strength measurement campaign. For example, the eNB may schedule each neighbor mB pair using a TDMA fashion, so that they do not interfere during the measurement campaign. If there are any, mB pairs that are physically far apart may be scheduled simultaneously by the eNB, in order to accelerate the process.

For each mB in the list and the candidate mB, specific Rx and/or Tx beams used may also be scheduled so specific interference measurements may be made. An associated eNB may determine an interference measurement schedule, and may provide this schedule to one or more mBs. One or more mBs may, based upon the interference management schedule, determine where (e.g., with respect to direction) and/or when to point their respective Tx and/or Rx beams, for example during an interference measurement campaign.

For example, a candidate mB may point to an mB_5, and mB_5 may point to the candidate mB (for a signal measure), and one or more other mBs in the list may point Rx beams to specified mB neighbors to get measures of interference when they are receiving from those specified beam directions. Measurements may be made in both directions (e.g., candidate mB to mB and mB to candidate mB). The measurements of the desired signal and/or the neighbor interference strengths may be sent back to the mB-MS, and a suitable list of mB mesh links may be selected and/or may be signaled to the candidate mB and/or one or more other affected mBs.

Recommended power levels may be incorporated. One or more short links may be able to make use of a very high SINR, but may cause a near far problem with one or more other links. For example, the eNB may order one or more mBs to adjust their respective radiated transmit powers, for example by changing the Tx power and/or antenna gain at particular beams, in order to reduce interference at one or more neighbors. The power adjustment of the beams may be iterative, such that the radiated beam power may be repeatedly changed as a measurement campaign at a particular mBs is carried out.

A beam shape refinement operation (e.g., for one or more beams used in the list of mesh links) may be performed. During beam refinement, the respective beam shapes of the candidate mB and one or more affected mBs may place nulls, or may otherwise alter the beam shape, in order to minimize interferences. Example interference may include interferences caused by transmissions of the candidate mB and the one or more affected mBs to the respective Rx beams of other mBs. One or more Tx beams may be modified to reduce interference, for example for one or more worst cases. Example interference may include interference seen by transmissions from one or more mBs on the respective Rx beams of other mBs. One or more Rx beams may be modified to reduce interference, for example for one or more worst cases.

Once the affected mBs and the candidate mB acknowledge the updated mesh link list, the candidate mB state may be made 'mB', for example by the eNB. One or more other mBs of the mB mesh network may be notified of the candidate mB joining the mmW mesh network. Backhaul traffic may be routed through the accepted candidate mB, and the cellular system may request that the accepted candidate mB service access link traffic.

An example mB direction discovery and interference measurement procedure may include time division, a discovery phase, and an output. During time division, a representative network composed of mBs, for example as depicted in FIG. 10, may be considered. The mBs (e.g., $mB_1 \ldots mB_9$) may be configured to learn possible beam directions between each other and/or may be configured to measure interference levels between each other.

Each mB may be allocated one of a number of predetermined (non-overlapping) time slots for signal measurement. In order to shorten an overall link establishment period in the system, one or more mBs with sufficient spatial separation may simultaneously apply measurement procedures. The cellular layer may determine which mBs may transmit beacons (e.g., beams) that may be used for signal measurement, and may provide synchronization (e.g. start and end times of the link acquisition periods). One or more techniques, such as spreading and/or FDM, may be employed to further enable separation of mB signals.

During the discovery phase, one or more beacon transmissions and/or signal measurements may be performed. A scheduled mB may perform beam steering. For example, the scheduled mB may transmit one or more beacons in a predetermined direction dir for each antenna array, where dir=$(\alpha,\theta,\varphi)$ with $\alpha,\theta,\varphi \in [-\pi/2,\pi/2]$ at a given time. One or more receiving mBs in the enhanced neighbor mB list may listen to the beacon transmissions by the scheduled mB. A fixed step-size may be assumed for each angular transmission. Each array may be denoted as k, k=1, 2, . . . N. To illustrate: t=[0,t1]: mB7 beam steering, {mB4,mB5, mB8}listen and measure signal and interference strength (assuming 2nd tier mBs and beyond do not receive); and t=[t1,t2]: mB8 beam steering, {mB7,mB4,mB5,mB6, mB9}listen and measure signal and interference strength.

For a scheduled mB, for example during a time duration [tm,tn], the following may be followed.

$k=1$, for array=k

One or more neighboring mBs may listen to the transmitting mB. For a select angular transmission, dir, for array k of the transmitting mB, one or more receiving mBs may measure the received signal by all antenna arrays (e.g., wide beam reception). For example, separate measurements may be made for each possible Rx beam, or the array may be configured to approximate a near-omni for a single measurement, or for a subset of measurements.

Each mB may inform the cellular layer about the received signal powers at each antenna array at the transmission direction dir (and possibly for each possible Rx beam). This may be repeated for all transmission directions. Alternatively, a best pointing direction for each mB may first be identified and information signaled to the network may be limited to those relevant beams.

When the transmitting mB completes the beacon transmission at all dir (e.g., completes beam sweeping), the cellular layer may order the received signals for all mBs and their antenna arrays out of all possible antenna array and transmission direction combinations, for example from higher to lower values. As an example, mB8 may be identified as having a highest received power from its receiving antenna array=A (assuming near-omni reception), and for the transmission direction=D. An ordered vector PmBRK may be assumed, where each entry gives a received power strength at a particular mB, its antenna array k, and the transmission direction, dir. This vector may be considered as a database which contains the received powers from all possible transmission beam (of a particular mB), receiving mB and its array, and transmit beam direction combinations. Alternatively, in a case of separate Rx beam measurement at each array, the database may be extended to include this information.

This database may be refined, for example by employing a beam refinement procedure between the candidate mBs that is saved at the cellular database as an ultimate link SNR value. One or more interference measurement at the neighbor mBs may be carried out, and may be saved at the database.

ind=1;

for ind<length(PmBRK)
For example, choose {Receiving mB, array, dir}=PmBRK(ind). PmBRK may be an ordered vector.

The cellular layer may schedule the transmitting mB and the receiving mB and its particular array, to employ a beam refinement procedure.

After the beam refinement procedure is completed between the transmitting and the selected receiving mB (e.g. after transmit beam refinement and receive beam selection and refinement), the receiving mB may measure the received signal quality, and may inform the cellular layer. This information may be stored in the cellular database and may be denoted as $SNR_{mBr}^{mBtk}$. This may be read as SNR at received mBr, transmitted by mBt from array k.

One or more other mBs may measure the received signals upon the paired mBs, to complete the beam refinement procedure. If the receiving mB already knows the particular Rx beams it is allocating for the communication with the other mBs, then the measurement may be performed at these particular beams. If not, the measurement may be performed at all arrays and this information may be stored in the cellular database. Each mB i may provide an interference vector denoted by $INR_{mBi}^{mBtk}=[INR_{mBi1}^{mBtk}, INR_{mBi2}^{mBtk}, \ldots, INR_{mBiN}^{mBtk}]^T$ that denotes the interference power level at each antenna array. If the Rx beams are allocated to other mB transmissions, the entry of this vector may contain the INR value measured at these Rx beams.

The cellular layer may combine the vectors to form an interference matrix $INR^{mBtk}=[INR_{mB1}^{mBtk}, INR_{mB2}^{mBtk}, \ldots, INR_{mBI}^{mBtk}]$. This may be the interference observed by the mBs (e.g., including all arrays) while mB k transmits and employs a beam refinement procedure with mBr. The received SNR may be $SNR_{mBr}^{mBtk}$ at mBr).

--- ind=ind+1; may be looped for all possible combinations in the database
end
k=k+1, may be looped for each transmit array k
end

---

Output may include refined link gains between each mB, and an array K with the neighboring mBs. The interference matrix for one or more neighboring mBs (e.g., all arrays) may correspond to this link establishment. The ordering of received powers may be used to employ a fixed number of beam refinement procedures, in order to shorten the overall link establishment period.

Figure 11:
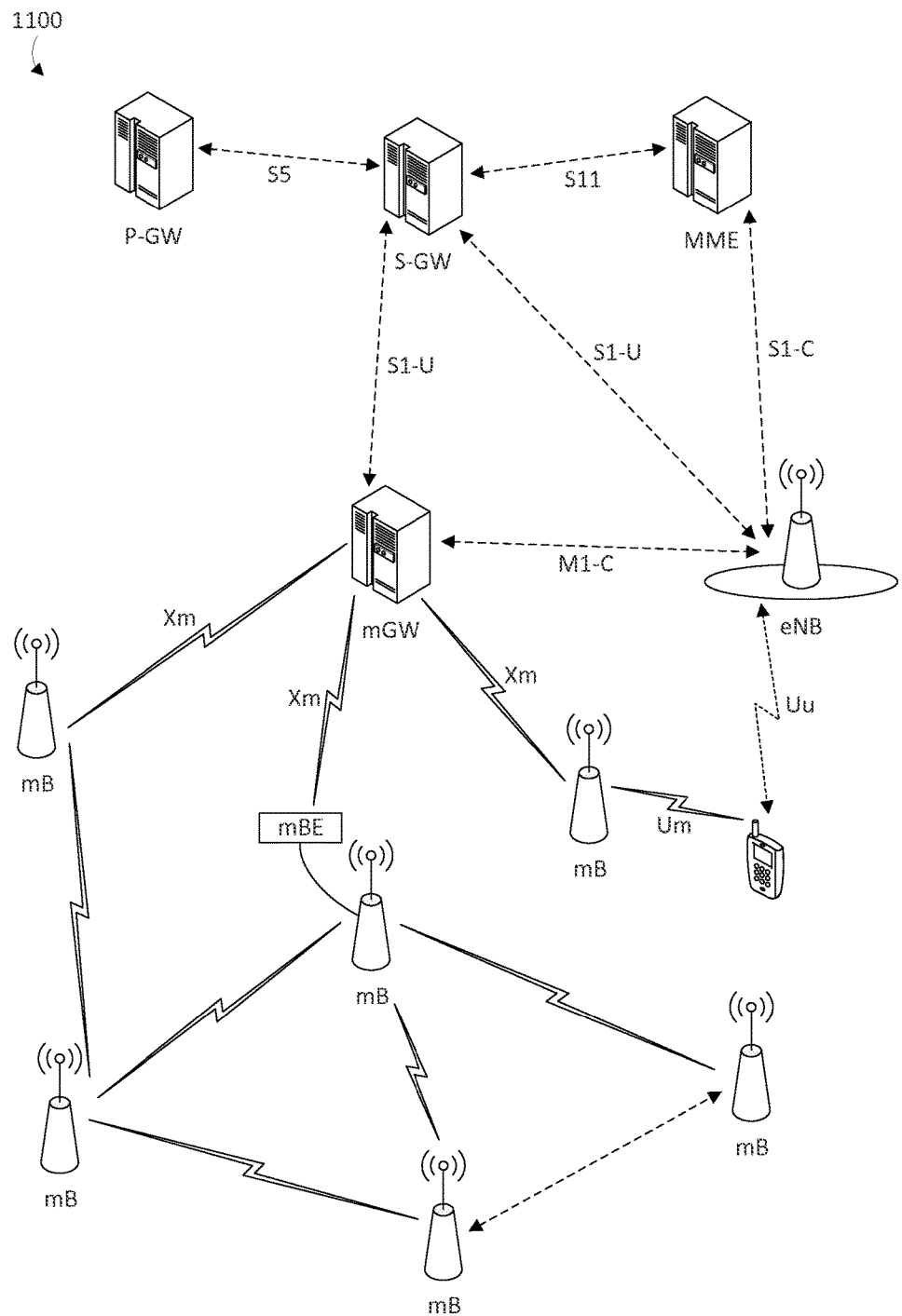
FIG. 11 depicts a block diagram of an example mmW system with mmW mesh backhaul.

FIG. 11 illustrates an example mmW system 1100 with mmW mesh backhaul. The network may include several small scale base stations denoted as mBs (mmW Base stations), which may be within the coverage area of at least one eNB. The user equipments, mUEs, may be UE's capable of operating at mmW and cellular links. In order to alleviate the operational complexity of the cellular base station for mmW control, a logical entity called mmW Gateway, denoted as mGW in FIG. 11, may be introduced into the architecture. The realization of the mGW node may be achieved, for example, by implementing it as a separate physical entity or it may be co-located with an eNB or S-GW. The mGW may provide the network with additional wired/fiber/P2P PoP aside from the eNB, which may provide offload of the mmW user traffic from the cNB. The eNB may be responsible for providing control for mmW traffic. The dense deployment of mBs and high access link data rates may necessitate feasible procedures to convey information between the mGW and mUEs. The relatively short range of mmW transmission due to high path-loss and penetration loss may require the mBs to be deployed close to each other, which may result in a high number of mBs within the eNB coverage. For the same reasons, it may not be realistic to establish direct physical connection between each mB to the mGW. Procedures to convey information between the mGW and mUEs may be required. Mesh networking is considered, which may overcome the burdens such as impracticality of fiber connection, requirement for long mmW links as well as relatively wide area coverage of mmW system, etc.

A mesh backhaul routing protocol (MBRP) may be provided. Issues for the routing protocol for the backhaul (BH) may include one or more of the following.

Figure 12:
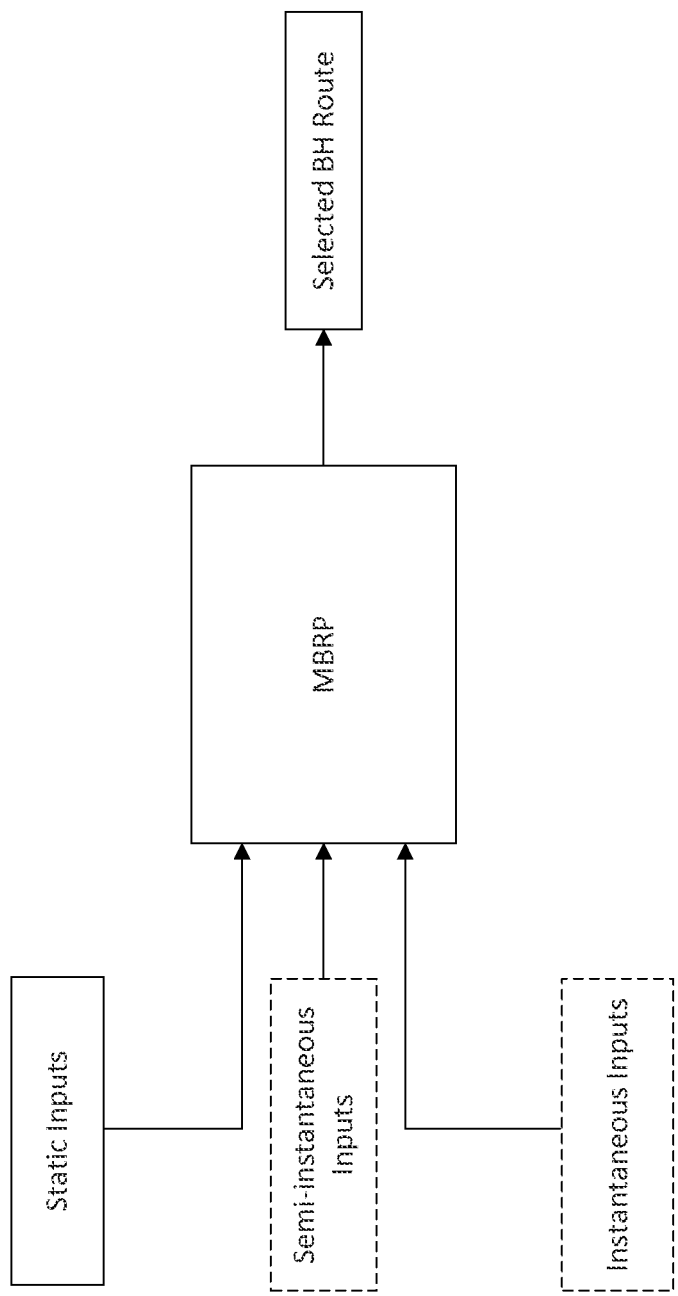
FIG. 12 depicts a block diagram of inputs to an example mesh backhaul routing protocol (MBRP).

Given the necessary information regarding the networks that may be categorized as static, semi-instantaneous, and instantaneous, necessary routing paths may need to be provided (e.g., paths with the best possible performance outputs such as capacity, latency, and the like). FIG. 12 illustrates example inputs to an example MBRP).

The static or slowly changing information may be aggregated and distributed over a large geographic area. This information, while possibly more global, may not capture quickly varying information. The instantaneous inputs may represent quickly varying information (although this may include slowly varying information) and may extend to node in the more immediate local. The categorization of the inputs may be application specific, and, a general classification for RNE system may be provided.

Static Inputs may include mB node capabilities. One or more of the following examples may apply: Number of antenna arrays, decode-forward transmission; mB locations (e.g., obtained from cellular layer); or the desired metric to be met by the BH: capacity, delay.

Semi-Static Inputs may include one or more of the following: average mB-mB link gains and Interference Information (e.g., obtained from a suitable BH Link Measurement Algorithm); average traffic load received/transmitted by each mB; or mB antenna arrays scheduled for access link transmission.

Instantaneous Inputs may include one or more of the following: instantaneous channel gains/availability between mBs (and their arrays)/Buffer status reports/possibly reports from likely extended neighbors (e.g., 1 hop away).

MBRP decision making cases may be disclosed. The routing decisions may depend in part on the system information availability at the cellular layer. The overall system information can be classified as described in FIG. 12. In the following, the MBRP may be based on the cellular layer involvement, which may depend on the system information available at eNB.

The cellular layer may have average-term system information and may provide long-term routing information. For example, the statistical information about the mB-mB link, e.g., the average link capacity $C_{ij}$ (1), may be stored at the eNB. The statistical information about the traffic may be routed through the mBs. Based on the average mB link gains, interference matrix and average traffic load conditions, the cellular layer may provide the candidate paths (e.g., with some metrics, such as reliability). It is up to the mBs to determine which mB is to transmit in the next hop, e.g., depending on their instantaneous channel/traffic information. For instance, a particular mB (e.g., its array) may be allocated for access scheduling, and may not be available for BH traffic.

The cellular layer may provide semi-instantaneous routing information. For example, the cellular layer may have statistical information about mB-mB links and the traffic routed through the mBs. The mBs may inform the cellular layer regarding the access link scheduling in advance. The possible routes may be updated based on the access link scheduling information and the mBs may be provided the updated routes. The mBs may determine which node to transmit, e.g., depending on the instantaneous information.

The cellular layer may provide instantaneous routing information. For example, the cellular layer may be informed about the instantaneous link gains (e.g., measured by the mBs), traffic conditions, and/or access scheduling. The routing decision may be made by the cellular layer and each mB in the route may be informed.

The cellular layer overlay may allow mmW mesh routing decisions to be taken in a centralized fashion. By varying the periodicity of the parameter updates at the routing coordinator, different versions of the MBRP such as static, semi-instantaneous, and instantaneous may be possible. Each version may have its own feedback rate and latency requirements on the cellular control layer.

An exemplary advantage of the cellular control layer is that it may allow network traffic conditions to be factored into the routing decisions via a traffic-aware route selection metric. The cellular control layer may obviate the need for network flooding for route selection. Along with a possible reduced network initialization delay, it may allow faster route adaptation after transient events like node failure. Centralized and decentralized MBRP may be disclosed, e.g., to show how existing protocols can be implemented within the context of MBRP.

A centralized routing may be disclosed. In this MBRP, a distance vector routing tree spanning from the mGW may be sought to be created. Here we consider a path selection metric, e.g. Airtime Link Metric ($C_a$) used in 802.11s standard, and show how the routing protocol may be designed around it when directional links and a separate control layer are used. The Airtime Link Metric may be defined as follows:

$$C_a = \left[O + \frac{B_t}{r}\right]\frac{1}{1-e_f}$$

where
O: channel access overhead including frame headers, training sequences, access protocol frames, etc.
$B_t$: test frame length in bits (constant)
r: transmission data rate in Mbps for test frame size $B_t$.
$e_f$: test frame error/loss rate for $B_t$.

A traffic-aware version of the Airtime Link Metric may include a metric such as time fraction ($t_f$) available at a node for additional traffic. A new traffic-aware airtime link metric may be defined such that $$C_{at} = f(C_a, t_f)$$

where the function $f(\bullet)$ is independent of the enablement described next.

How the cellular assisted routing function may work for mmW directional communications may be disclosed. One or more of the following may apply.

After an mB is energized the initial BH link measurement and/or neighbor discovery may take place. At the end of the initial BH link measurement and/or neighbor discovery, the mB may have an estimate of the link quality to each of its neighbors (e.g., either in terms of transmission data rate for a test frame size or in terms of signal-to-interference-plus-noise ratio (SINR)). There may be no loss of generality in assuming already functioning neighbor mBs, which in the initial case of the first mB joining the mesh may involve link formation with the mGW as a neighbor, if within range. The mB may create a list of other mB-to-mB links that may cause its SINR to a neighboring mB to drop below a pre-defined threshold, which may indicate potential directional interference. This may become a part of a black-list at the central routing coordinator, e.g., to avoid inter-mB interference. The per-neighboring-mB link quality estimates and the black-list may be reported to the routing coordinator via messages on the cellular layer.

The coordinator may determine the best or an ordered set of paths back to the mGW, e.g., based on the implemented path quality metric. Since the neighbor mBs may be part of an already functioning mesh network, the routing coordinator may have previously evaluated the optimum paths for each of them to reach the mGW based on their respective cumulative metrics. Recursion of this procedure for some or all mBs may generate the optimum multi-hop paths to the edge nodes without resorting to network flooding. The routing coordinator may increment the cumulative metrics for each of the neighbor mBs by the path metric reported by the joining mB to determine the optimum or an ordered set of metric values for the new mB. The best neighbor or an ordered set of neighbor mB identities may be communicated to the joining mB via cellular layer messages. The metric values for each neighbor mB may be delivered to the joining mB for use in average-term input case.

After initial route setup the mesh network operation may depend on the type of network (e.g., static/semi-static/instantaneous), and, there may be different procedures for each. When using average-term inputs, the controller may use statistical estimates of the link qualities and traffic at each node for route determination, and subsequent updates may involve statistical quantities, with minimal feedback communication between the mBs and the controller on the cellular layer. The mBs may maintain an ordered set of neighbor mBs to use for forwarding traffic, e.g., to recover from link deterioration or loss between scheduled route update messages. The switch from the optimum link to an alternate may be triggered by a link deterioration determination, e.g., due to reduction in link margin on received packets, non-receipt of ACK frame from the recipient, etc.

Knowledge of the link metric for alternate links may enable the choice to switch the link due to deteriorating link margin, e.g., by comparing against the next best available value. The link switch may be communicated to the coordinator via a cellular layer message, which may updates its routing tables accordingly.

The case of semi-instantaneous information may involve the mBs informing the coordinator of their scheduling on the access link in advance, and may not affect the routing algorithm. This case may be the same as the average-term case.

In the instantaneous case, a link quality estimate for each of its neighbor mBs and traffic load may be reported by each mB to the controller at high frequency on the cellular layer. The link quality estimate may be based on the observed link margin on the last received frame and the traffic load may be reported as the presently available time fraction for wireless traffic. The routing decisions from the controller may be conveyed to the mBs with high frequency, e.g., in terms of the best next-hop node identity. The controller may transmit routing information for an mB if it is different from the previous decision, to decrease the control feedback traffic.

In case of node failure on the mmW channel, the affected node may notify the routing coordinator of a failure on the cellular network, e.g., for rapid re-routing around the failure.

Figure 13:
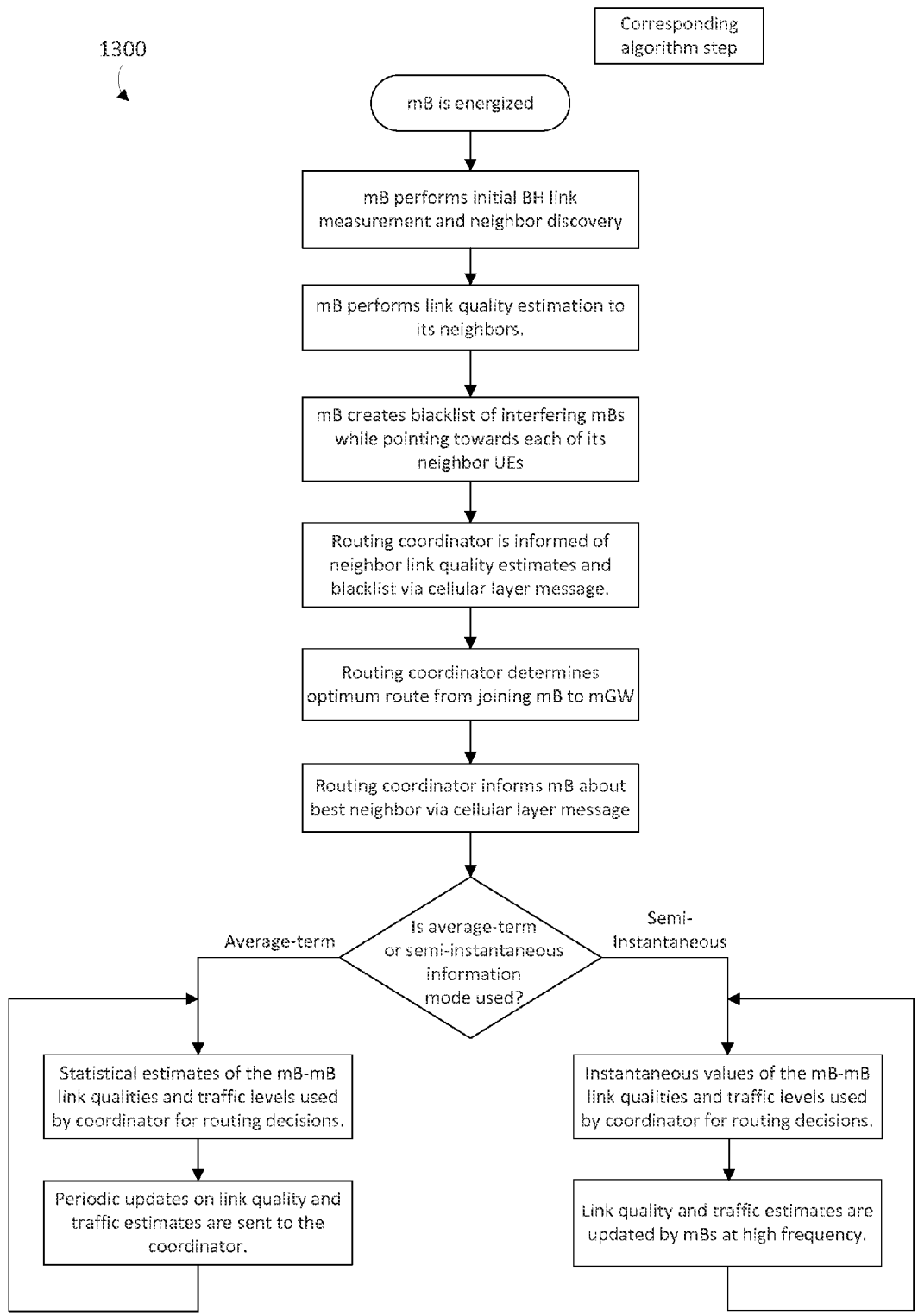
FIG. 13 illustrates an example operational process flow a centralized MBRP.

Decentralized routing may be disclosed. FIG. 13 is an example process flow 1300 of centralized MBRP operation. It may be described how a decentralized version of MBRP may be implemented. For this, we consider the DMesh algorithm as an example and show how the message exchange may occur over two available bands: the mmW underlay and the cellular overlay. One or more of the following may apply.

After an mB is energized the initial BH link measurement and neighbor discovery may be performed. In the DMesh algorithm, physical tree formation may be initiated by the periodic transmission of Host and Network Association (HNA) messages by prospective Parent nodes on the omni-directional interface, e.g., to allow joining nodes to discover existing mesh nodes. In MBRP, the cellular-layer may enable efficient neighbor discovery for a joining mB. The HNA messages in MBRP may not be used for neighbor discovery, but may be used for link quality evaluation of potential first-hop links by the joining mB. The HNA messages may be periodically transmitted by the potential next-hop neighbors identified previously (e.g. potential Parent nodes in DMesh architecture) in a pre-negotiated schedule to enable the joining mB (e.g., Child node in DMesh) to evaluate individual link quality.

The joining mB may inform the chosen next-hop neighbor and/or the other candidates of its decision via cellular layer messages. This may indicate to the chosen next-hop mB and the other candidates that they should stop transmitting HNA messages. The HNA messages and the response from the joining mB may include their IP addresses, which may allow the receiving mB to associate its chosen beams, to communicate with the other mB, with the other mB's IP address. This identity, which may be called Pointing IP address (IP), may allow IP address based filtering, e.g., so that packets received from unintended mBs via antenna side-lobes or even the main-lobe may be filtered out.

The identified Parent node may periodically transmit a READY message in the direction of the Child node on the mmW layer. Upon successful reception of a READY message, the joining mB may respond with a JOIN message in the chosen neighbor mB's direction on the mmW layer, which may confirm link set-up. Subsequently, the chosen neighbor mB may transmit a ROUTE_SETUP message to the eNB on the cellular layer with joining mB's IP address, e.g., so that routing tables can be updated.

The eNB may multicast the routing table update information to route members along the tree from the edge mB to the mGW, e.g., via cellular layer messages. Similarly, when an mB wants to switch parents (e.g., due to better link quality evaluation to another mB), it may inform the eNB about the new next-hop mB (e.g., Parent node in DMesh), and the eNB may inform mBs along the old and the new trees to the mGW to update their routing tables accordingly.

Figure 14:
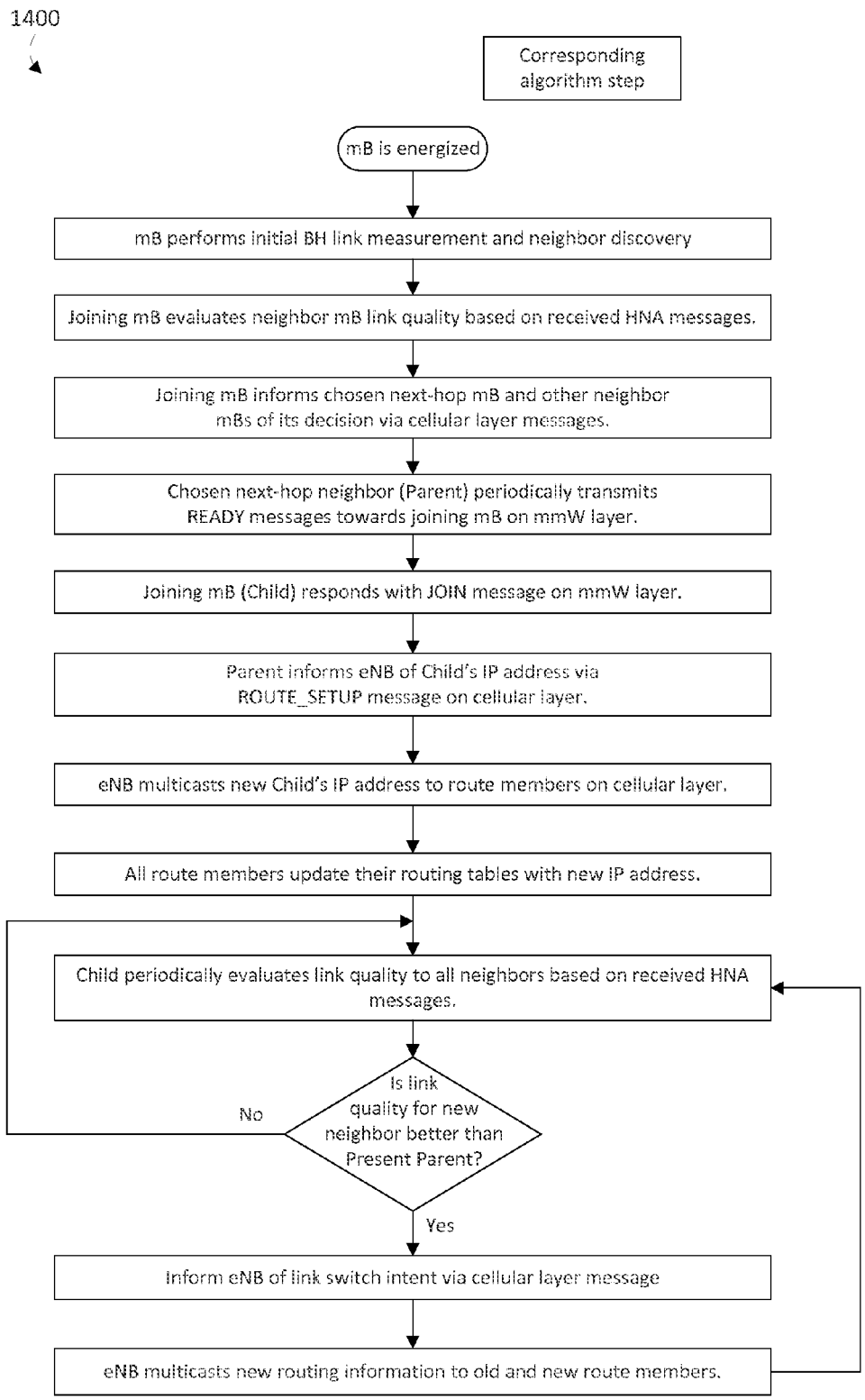
FIG. 14 illustrates an example operational process flow a decentralized MBRP.

FIG. 14 is an exemplary process flow 1400 of decentralized MBRP. For a general RNE system, the backhaul routing and access link scheduling may be interconnected. It may be beneficial to design the access link scheduling considering the inputs from the routing protocol. Such inputs may be composed of but not limited to one or more of the following: the capacity of the candidate routes; delay information along the routes; traffic load condition of the routes; and the like.

Backhaul-aware access link scheduling may provide better utilization of access resources and QoS requirements. A proportional fairness metric may be defined that may include the inputs from the BH links, QoS requirement for the application to be transmitted to a particular mUE such that:

$$PF=f(PF_{BH}, QoS, PF_{AL}) \quad (1)$$

where $f(\cdot)$ is the composite proportional fairness matrix to be determined (e.g., based on the metric to be optimized), $PF_{AL}$ is proportionally fairness metric for access link, $PF_{BH}$ is the proportionally fairness metric for BH, and QoS is the quality of service requirement for the application to be transmitted to mUE. $PF_{BH}$ is to be determined by the backhaul conditions mentioned above.

A joint access link scheduling and BH routing protocol flow may be disclosed, which may assume the cellular layer has the average-term link gains. The eNB may have short term information to the other mBs in its neighborhood. We may assume that the routing tables are already determined in either centralized or decentralized mode, e.g., as described herein, and the routing table information is available at the cellular layer. One or more mUEs may already be associated with corresponding mBs (e.g. each mUE may be assumed to be associated to one mB) and cellular layer association/configuration may already be established. One or more of the following may apply.

An mUE may be pinged by the cellular layer about data transmission in the downlink. An mUE may search for mBs. Beam acquisition with the candidate (e.g., neighboring) mBs may be employed. The cellular layer may help with the beam acquisition, e.g., the location of the mBs may be conveyed to the mUE. An mUE may obtain the channel gains (e.g., after beam acquisition and refinement) with respect to each candidate mB. This information may be sent to cellular layer.

Using the access link channel gain obtained above, the eNB may identify the possible routes to the mUE from the routing table obtained above. The relative metric of each route, e.g., capacity, may be calculated. The eNB may inform one or more mBs regarding the candidate routes, for example based on one or more average mmW channel gains. The eNB may provide this information to one or more mBs, for example using the cellular layer. One or more mBs may be configured to select an actual next hop (e.g., in a route) from a candidate set. The selection may be based, for example, on instantaneous mmW channel state information (CSI), for example as observed at an mB and/or at one or more neighbor mBs.

The cellular layer may order the possible routes with respect to their relative metrics; e.g., Route 1>Route 2> . . . >Route N, where ">" may refer to having a better metric. The eNB may inform each mB on the possible routes regarding one or more of the following: the next mBs (hops) on the routes, e.g., mB_b in Route 1; mB_c in Route 2 for mB_a; the average link gain to these mBs; the average gain between mB_a and mB_b; or the average gain between mB_a and mB_c. The mB that wishes to transmit the packet on the route may compare the instantaneous link gain with the average link gain to the candidate mB in the selected route. If the instantaneous CSI is close enough to average link gain, the packet may be transmitted to this mB. If the instantaneous CSI is comparably worse than Average link gain (e.g., worse than the average capacity in the other route), another route may be selected and the above may be applied.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer. Features and/or elements described herein in accordance with one or more example embodiments may be used in combination with features and/or elements described herein in accordance with one or more other example embodiments.

What is claimed:

1. A method for configuring a millimeter wave (mmW) mesh network, the method comprising:
   receiving, from a candidate node configured for millimeter wave communication, a request to join the mmW mesh network;
   sending, to the candidate node, a mesh neighbor candidate list comprising mmW nodes identified as candidate mesh neighbors for the candidate node;
   determining a mmW signal strength of the candidate node at a location;
   testing that the candidate node conforms to a requirement of the mmW mesh network;
   sending, to the candidate node, deployment aid information to help avoid mmW signal shadowing, the deployment aid information comprising the mmW signal strength of the candidate node at the location and a suggested geographic location for the candidate node;
   determining a mmW node included in the mesh neighbor candidate list sent to the candidate node; and
   sending, to the mmW node a request to perform a beam refinement procedure based on an indication that the candidate node conforms to the requirement of the mmW mesh network.

2. The method of claim 1, wherein the request to join the mmW mesh network is received from the candidate node via a cellular access link.

3. The method of claim 1, further comprising:
   receiving, from the candidate node, an mmW base station identification associated with the candidate node; and
   authenticating the mmW base station identification.

4. The method of claim 1, wherein testing that the candidate node conforms to the requirement of the mmW mesh network comprises sending a message to the mmW node to request a beam orientation procedure between the candidate node and the mmW node.

5. The method of claim 1, wherein testing that the candidate node conforms to the requirement of the mmW mesh network further comprises determining at least one of signal levels between the mmW node and the candidate node, or interference levels between the mmW node and the candidate node.

6. The method of claim 1, further comprising sending information to the candidate node, wherein the information provided to the candidate node comprises at least one of a beam acquisition start time, a duration of beam refinement, or a number of beams to be tested.

7. The method of claim 1, wherein testing that the candidate node conforms to the requirement of the mmW mesh network comprises scheduling respective signal strength measurements between the candidate node and the mmW node from the mesh neighbor candidate list, and between the candidate node and a second mmW node from the mesh neighbor candidate list.

8. The method of claim 7, wherein the signal strength measurements are scheduled in respective non-overlapping time slots.

9. The method of claim 7, wherein the signal strength measurements are scheduled in accordance with a spatial separation between the mmW node and the second mmW node.

10. The method of claim 1, wherein testing that the candidate node conforms to the requirement of the mmW mesh network comprises causing the mmW node and a second mmW node from the mesh neighbor candidate list to adjust corresponding radiated transmit powers in accordance with an interference measurement campaign.

11. A network device, the network device comprising:
   a processor configured to:
      receive, from a candidate node configured for millimeter (mmW) wave communication, a request to join a mmW mesh network;
      send, to the candidate node, a mesh neighbor candidate list comprising mmW nodes identified as candidate mesh neighbors for the candidate node;
      determine a mmW signal strength of the candidate node at a location;
      test that the candidate node conforms to a requirement of the mmW mesh network;
      send, to the candidate node, deployment aid information to help avoid mmW signal shadowing, the deployment aid information comprising the mmW signal strength of the candidate node at the location and a suggested geographic for the candidate node;
      determine a mmW node included in the mesh neighbor candidate list sent to the candidate node; and
      send, to the mmW node, a request to perform a beam refinement procedure based on an indication that the candidate node conforms to the requirement of the mmW network.

12. The network device of claim 11, wherein the request to join the mmW mesh network is received from the candidate node via a cellular access link.

13. The network device of claim 11, the processor further configured to:
receive, from the candidate node, an mmW base station identification associated with the candidate node; and
authenticate the mmW base station identification.

14. The network device of claim 11, wherein the test that the candidate node conforms to the requirement of the mmW mesh network comprises sending a message to the mmW node to request a beam orientation procedure between the candidate node and the mmW node.

15. The network device of claim 11, wherein the test that the candidate node conforms to the requirement of the mmW mesh network comprises determining at least one of signal levels between the mmW node and the candidate node, or interference levels between the mmW node and the candidate node.

16. The network device of claim 11, wherein the processor is further configured to send information to the candidate node, wherein the information provided to the candidate node comprises at least one of a beam acquisition start time, a duration of beam refinement, or a number of beams to be tested.

17. The network device of claim 11, wherein the test that the candidate node conforms to the requirement of the mmW mesh network comprises scheduling respective signal strength measurements between the candidate node and the mmW node from the mesh neighbor candidate list, and between the candidate node and a second mmW node from the mesh neighbor candidate list.

18. The network device of claim 17, wherein the signal strength measurements are scheduled in respective non-overlapping time slots.

19. The network device of claim 17, wherein the signal strength measurements are scheduled in accordance with a spatial separation between the mmW node and the second mmW node.

20. The network device of claim 11, wherein the test that the candidate node conforms to the requirement of the mmW mesh network comprises causing the mmW node from the mesh neighbor candidate list and a second mmW node from the mesh neighbor candidate list to adjust corresponding radiated transmit powers in accordance with an interference measurement campaign.

* * * * *